(12) United States Patent
Evans

(10) Patent No.: US 11,553,028 B1
(45) Date of Patent: Jan. 10, 2023

(54) PROACTIVELY DETERMINING AND MANAGING POTENTIAL LOSS OF CONNECTIVITY IN AN ELECTRONIC COLLABORATIVE COMMUNICATION

(71) Applicant: Fuze, Inc., Boston, MA (US)

(72) Inventor: Aaron Evans, Ottawa (CA)

(73) Assignee: Fuze, Inc., Campbell, CA (US)

( * ) Notice: Subject to any disclaimer, the term of this patent is extended or adjusted under 35 U.S.C. 154(b) by 0 days.

(21) Appl. No.: 17/691,361

(22) Filed: Mar. 10, 2022

Related U.S. Application Data

(60) Provisional application No. 63/167,449, filed on Mar. 29, 2021.

(51) Int. Cl.
| | |
|---|---|
| *H04L 65/80* | (2022.01) |
| *H04L 43/0811* | (2022.01) |
| *H04L 65/1096* | (2022.01) |
| *H04L 65/403* | (2022.01) |

(52) U.S. Cl.
CPC .......... *H04L 65/80* (2013.01); *H04L 43/0811* (2013.01); *H04L 65/1096* (2013.01); *H04L 65/403* (2013.01)

(58) Field of Classification Search
CPC .......... H04L 65/00–65/80; H04L 43/08–43/12
See application file for complete search history.

(56) References Cited

U.S. PATENT DOCUMENTS

| | | | | |
|---|---|---|---|---|
| 10,326,879 | B1 * | 6/2019 | Makagon | G06N 3/084 |
| 2013/0113873 | A1 * | 5/2013 | Chang | H04L 65/4053 |
| | | | | 348/14.08 |
| 2013/0279678 | A1 * | 10/2013 | Beerse | H04M 3/2227 |
| | | | | 379/202.01 |
| 2015/0029881 | A1 * | 1/2015 | Finlayson | H04L 43/55 |
| | | | | 370/252 |
| 2015/0280970 | A1 * | 10/2015 | Heda | H04L 12/1822 |
| | | | | 714/4.11 |
| 2017/0302723 | A1 * | 10/2017 | Skowronek | H04L 65/80 |

* cited by examiner

*Primary Examiner* — Clayton R Williams

(57) ABSTRACT

Non-limiting examples of the present disclosure describe proactive detection and notification of a potential loss of connectivity during an electronic collaborative communication. Subsequently, a state of the electronic collaborative communication is managed to improve, among other technical advantages, processing efficiency of associated computing devices and users involved in the electronic collaborative communication. A quality of a network feed for a participant in an electronic collaborative communication is identified and analyzed to generate a warning of potential loss of connectivity. A state of an electronic collaborative communication is managed relative to a continued quality evaluation of said network feed. For example, a network feed may be placed on hold and/or a communication suspended due to potential connectivity issues. A representation of a video feed may be updated and/or a communication resumed when a quality of that video feed is determined to satisfy a pre-selected quality threshold.

20 Claims, 13 Drawing Sheets

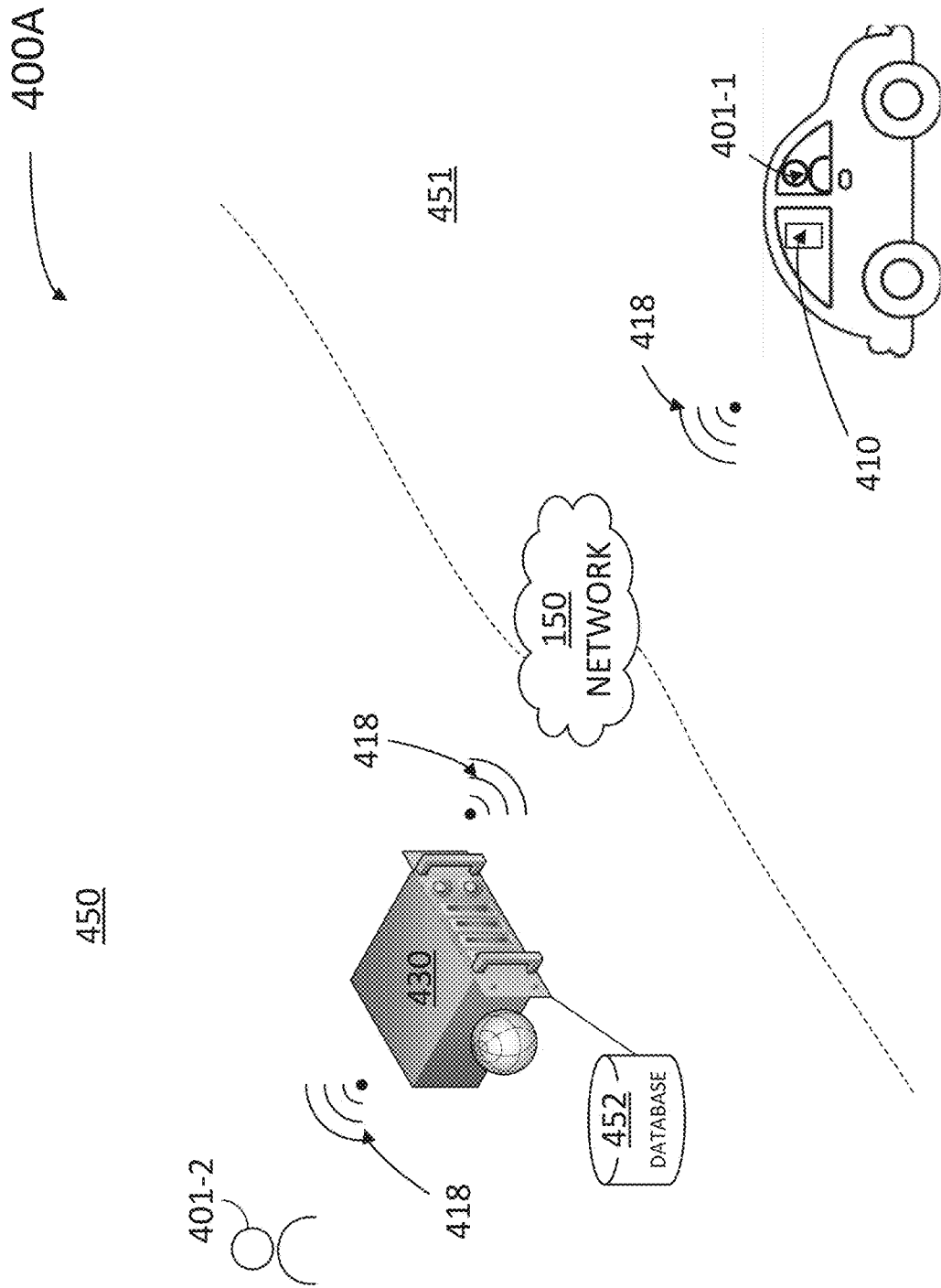

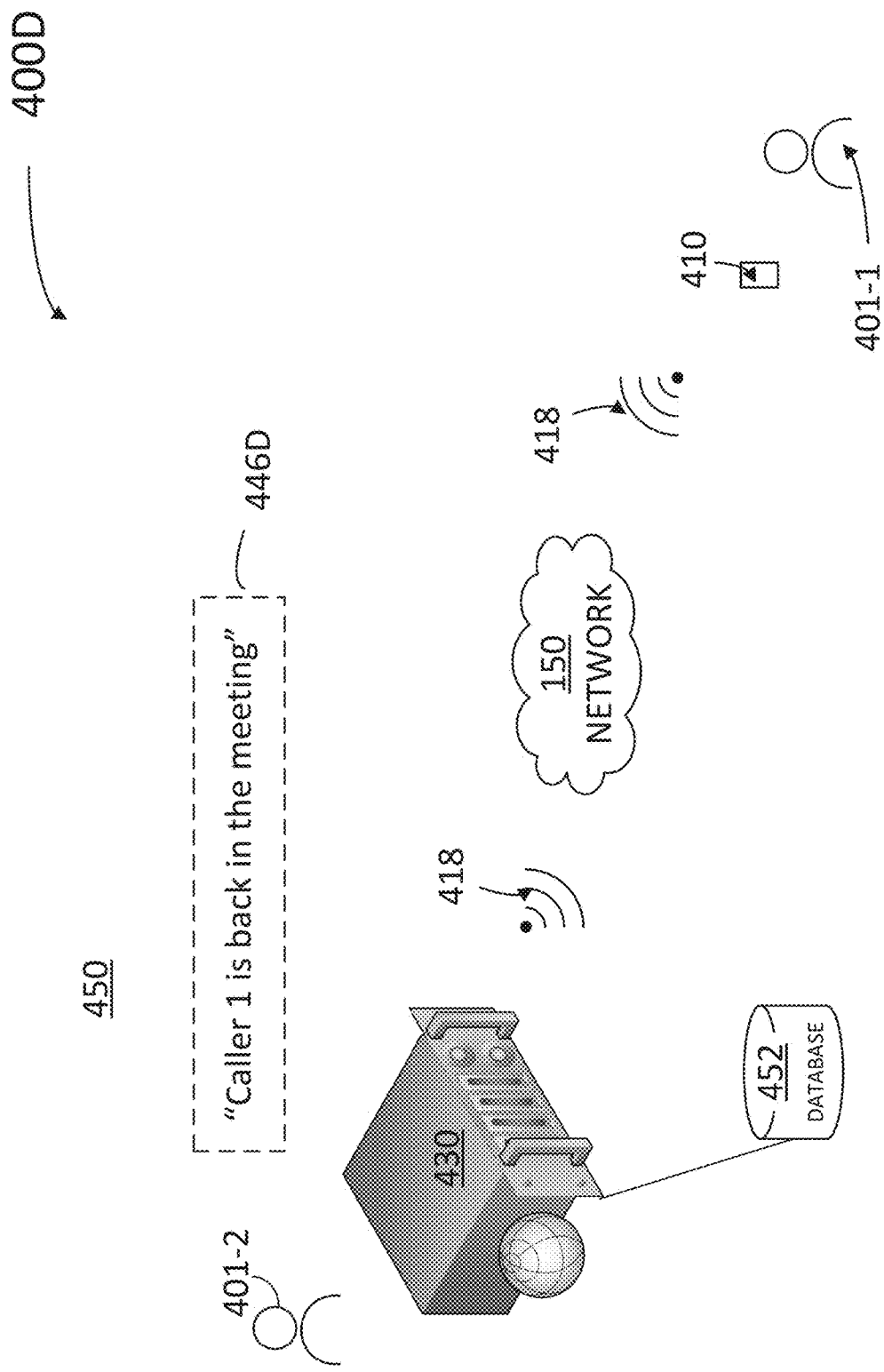

US 11,553,028 B1

PROACTIVELY DETERMINING AND MANAGING POTENTIAL LOSS OF CONNECTIVITY IN AN ELECTRONIC COLLABORATIVE COMMUNICATION

CROSS-REFERENCE TO RELATED APPLICATIONS

The present disclosure claims priority under 35 U.S.C. § 119(e) and is related to U.S. Provisional Appln. No. 63/167,449, entitled WARNING USER OF POTENTIAL LOSS OF CONNECTIVITY IN A TELECONFERENCE WITH MULTIPLE PARTICIPANTS, filed on Mar. 29, 2021, to Aaron Evans, the contents of which are incorporated herein by reference, in their entirety, for all purposes.

BACKGROUND

Field

The present disclosure generally relates to improving operation of electronic collaborative communications as well as operation of computing devices associated therewith. More specifically, the present disclosure relates to handling network connectivity issues by proactively determining a potential loss of connectivity and thereafter improving management of a state of an electronic collaborative communication.

Description of the Related Art

Current teleconferencing platforms are unable to handle sudden connectivity drops for one or more participants. These occurrences are becoming more frequent as people are able to log into a teleconference from a remote location using one of multiple mobile devices. The teleconference server is unable to control different network configurations of these mobile devices, nor the network quality of a specific remote location where a participant may be logging from. In some instances, one of the participants may be experiencing a technical problem with the connectivity, and current systems simply drop the participant from the call. While some systems keep trying to log the participant back into the meeting, these efforts typically involve heavy input from the dropped participant, the host of the teleconference, or maybe even some of the other participants. Accordingly, the experience is highly dissatisfying for all the participants.

SUMMARY

Non-limiting examples of the present disclosure describe proactive detection and notification of a potential loss of connectivity during an electronic collaborative communication. Subsequently, a state of the electronic collaborative communication is managed to improve, among other technical advantages, processing efficiency of associated computing devices and users involved in the electronic collaborative communication. A quality of a network feed for a participant in an electronic collaborative communication is identified and analyzed to generate a warning of potential loss of connectivity. As one example, a notification of that warning is proactively generated to enable a participant network feed to be placed on hold until a quality of their network feed improves above a pre-selected quality threshold. A state of an electronic collaborative communication is managed relative to a continued quality evaluation of said network feed. For example, a network feed may be placed on hold and/or a communication suspended due to potential connectivity issues. In some examples, this action may be programmed to occur automatically while other examples direct users to provide user action if desired. A representation of a video feed may be updated and/or a communication resumed when a quality of that video feed is determined to satisfy a pre-selected quality threshold.

In one embodiment of the present disclosure, a computer-implemented method is described that comprises identifying a quality of a network feed from a first participant in an electronic collaborative communication (e.g., teleconference) including multiple participants. A notification is provided (e.g., to the first participant) indicating that the quality of the network feed is deteriorating and further provides a menu of options that comprises a hold-state option configured to enable placement of the network feed on hold until the quality of the network feed is determined to satisfy a pre-selected quality threshold. The computer-implemented method also comprises placing the network feed of the first participant on hold in response to an indication of a selection made via the hold-state option. One or more of the multiple participants in the electronic collaborative communication are notified that the network feed of the first participant has been placed on hold in response to the indication of the selection made via the hold-state option. A representation of the network feed of the first participant is then updated, within the electronic collaborative communication, to indicate a return from hold when a determination is made that the quality of the network feed satisfies the pre-selected quality threshold. The one or more of the multiple participants in the electronic collaborative communication are then notified that the representation of the network feed of the first participant is updated within the electronic collaborative communication.

According to one embodiment, a system is described that includes one or more processors and a memory coupled to the one or more processors, the memory including instructions that, when executed by the one or more processors, cause the one or more processors to identify a quality of a network feed from a first participant in an electronic collaborative communication (e.g., teleconference) including multiple participants. A notification is provided to the first participant indicating that the quality of the network feed is deteriorating and further provides a menu of options that comprises a hold-state option configured to enable placement of the network feed on hold until the quality of the network feed is determined to satisfy a pre-selected quality threshold. The instructions further cause the one or more processors to place the network feed of the first participant on hold in response to an indication of a selection made via the hold-state option. One or more of the multiple participants in the electronic collaborative communication (e.g., teleconference) are then notified that the network feed of the first participant has been placed on hold in response to the indication of the selection made via the hold-state option. A representation of the network feed of the first participant is then updated, within the electronic collaborative communication, to indicate a return from hold when a determination is made that the quality of the network feed satisfies the pre-selected quality threshold. The one or more of the multiple participants in the electronic collaborative communication are then notified that the representation of the network feed of the first participant is updated.

According to another embodiment of the present disclosure, a computer-implemented method is described that comprises identifying a quality of a network feed from a first caller in a one-to-one call including a second caller. A notification is provided, to the first caller, indicating that the quality of the network feed is deteriorating, and a graphical user interface feature is presented for a user that enables the user to take action to manage a state of the one-on-one call relative to the potential connectivity issue. In one example, a hold-state option presented as a graphical user interface feature, that when selected, is configured to place the one-to-one call on hold until the quality improves above a pre-selected quality threshold. In another example, a GUI menu (e.g., menu of options) is presented to the first caller that comprises a hold-state option presented as a graphical user interface feature, that when selected, is configured to place the one-to-one call on hold until the quality improves above a pre-selected quality threshold. In response to receiving an indication of a selection made via an exemplary hold-state option, the one-to-one call is placed on hold. The second caller is then notified that the one-to-one call has been placed on hold by the first caller due to a connectivity issue in response to receiving the indication of the selection made via the hold-state option. A state of the one-to-one call is then updated in response to a result of a subsequent quality evaluation of a quality of the network feed. For example, the one-to-one call is updated to reconnect feeds of the first caller and the second caller when a determination is made that the quality of the network feed of the first caller satisfies the pre-selected quality threshold. For example, the notifying comprises notifying the second caller in the one-to-one call that the network feed of the first caller has been re-established, and wherein notifying the second caller comprises providing one or more of: an audible signal associated with the one-to-one call, a visual indication in a representation of the one-to-one call, and a textual indication in the representation of the one-to-one call.

In further embodiments, a computer-implemented method includes identifying a quality of a network feed of a first participant in an electronic collaborative communication (e.g., teleconference) including two or more participants. Further, the computer-implemented method comprises determining that the quality of the network feed of the first participant has deteriorated below a pre-selected quality threshold. Additionally, the computer-implemented method automatically places the network feed of the first participant on hold based on a determination that the quality of the network feed has deteriorated below the pre-selected quality threshold. Further, in response to the automatically placing, a notification is automatically provided, to one or more of the multiple participants of the electronic collaborative communication. An exemplary notification indicates that the network feed of the first participant has been placed on hold. Subsequently, a state of the electronic collaborative communication is automatically updated for the multiple participants. In one example, the automatically updating of the state of the electronic collaborative communication comprises suspending the electronic collaborative communication. In further examples, the automatically updating of the state of the electronic collaborative communication further comprises re-establishing the teleconference when the quality of the network feed is determined to meet or exceed the pre-selected quality threshold. As an example, the re-establishing comprises updating, within the electronic collaborative communication, a representation of the network feed of the first participant to indicate a return from hold for the first participant.

According to one embodiment, a non-transitory, machine-readable medium is described that includes instructions, which when executed by one or more processors, cause a computer to perform a method including identifying a quality of a network feed from a first participant in a teleconference including multiple participants, and providing, for the first participant, a notification that the quality of the network feed is deteriorating and a menu of options including to place the network feed on hold until the quality improves above a pre-selected quality threshold. The method also includes notifying the participants in the teleconference that the first participant has been put on hold when the first participant chooses a hold-state option from the menu of options, bringing the network feed from the first participant back into the teleconference when the quality of the network feed improves above the pre-selected quality threshold; and notifying the participants in the teleconference that the network feed from the first participant is back into a teleconference feed.

In yet another embodiment, a system is described that includes a first means to store instructions and a second means to execute the instructions to cause the system to perform a method. The method includes identifying a quality of a network feed from a first participant in a teleconference including multiple participants and providing, for the first participant, a notification that the quality of the network feed is deteriorating and a menu of options including to place the network feed on hold until the quality improves above a pre-selected quality threshold. The method also includes notifying the participants in the teleconference that the first participant has been put on hold when the first participant chooses a hold-state option from the menu of options, bringing the network feed from the first participant back into the teleconference when the quality of the network feed improves above the pre-selected quality threshold, and notifying the participants in the teleconference that the network feed from the first participant is back into a teleconference feed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIGS. 4A-4D illustrate a display in a mobile application for finding one or more handsets within a locality, according to some embodiments.

In the figures, elements and steps denoted by the same or similar reference numerals are associated with the same or similar elements and steps, unless indicated otherwise.

DETAILED DESCRIPTION

Figure 1:
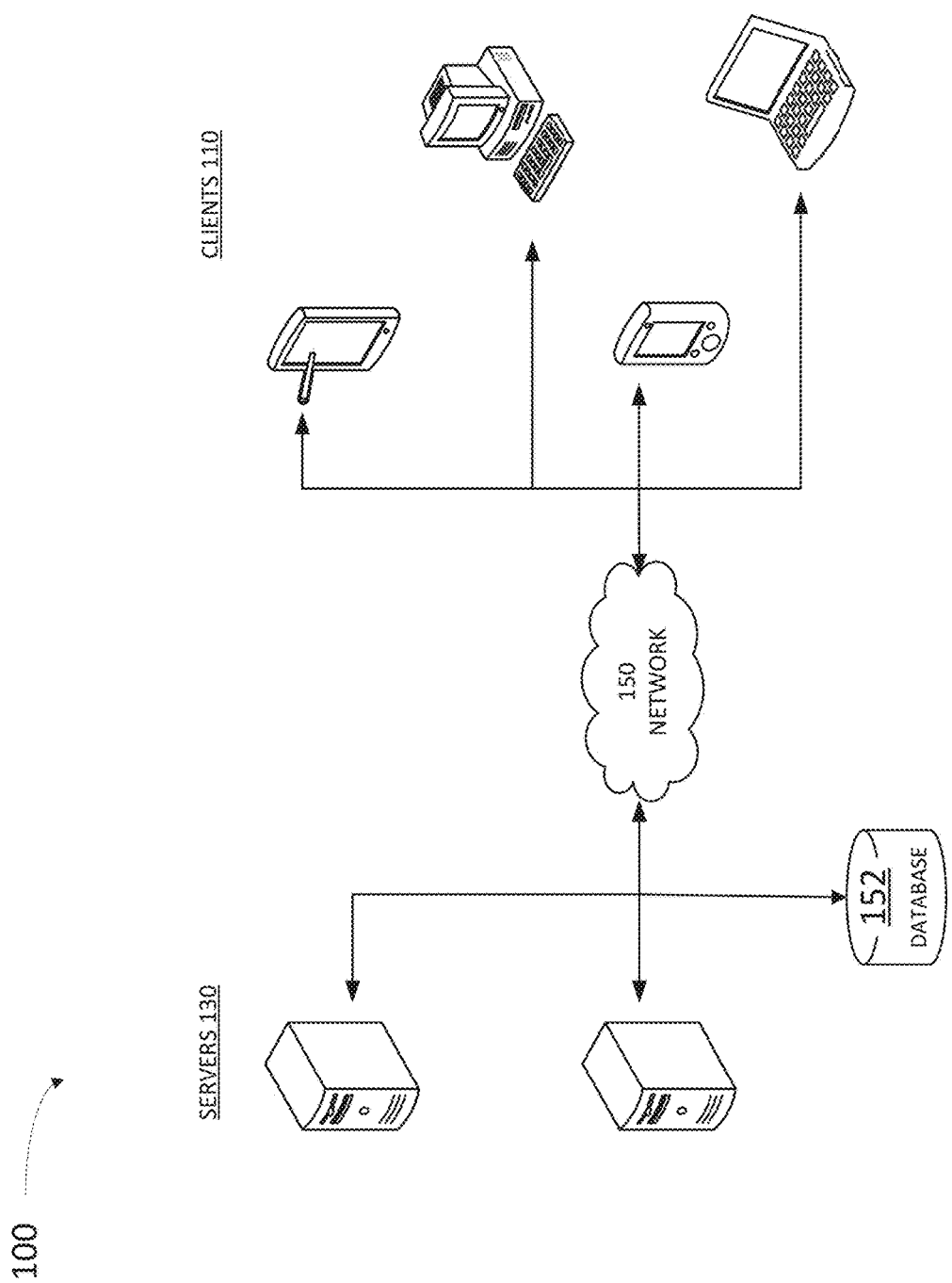
FIG. 1 illustrates an example architecture suitable to provide a platform for warning participants of a potential loss of connectivity in a teleconference or a one-to-one call event, according to some embodiments.

An electronic collaborative communication is a collaboration of two or more participants collaborating via respective computing devices using an application or web service. For ease of explanation, non-limiting examples of electronic collaborative communications described herein comprise: teleconferencing; and video and/or voice calling. However, it is to be recognized that the present disclosure can be applied to any type of electronic collaborative communication as contemplated and known by one skilled in the field of art. In some examples, electronic collaborative communications are enabled and conducted through SaaS applications or services, where users of SaaS applications or services electronically collaborate with one another via VoIP, PSTN, or the like. Further, it is recognized that the present disclosure applies to any type of SaaS instance. For example, users may collaborate via cloud-based communication applications or services that offer functionality for management of electronic collaborative communications via desktop and/or mobile applications/services.

Electronic collaborative communications have become a common occurrence in the lives of millions of people, and the trend will likely increase. Moreover, mobile devices having high-end capabilities such as video, audio, or even artificial intelligence data processing and voice recognition are more prevalent amongst users who may be participants in an electronic collaborative communication such as a teleconference. In an example where an electronic collaborative communication is a teleconference, a participant may encounter a technical difficulty with a first device that is active in the teleconference and may be dropped from a teleconference call.

General Overview

For ease of explanation, the present disclosure may subsequently use an example of a teleconference (or teleconferencing) as an example of an electronic communication. Some applications may attempt to solve the above problem and reconnect the user to the teleconference. However, these attempts typically include a request for user interaction, or an action by the host or other participant in the teleconference. At best, many teleconferencing applications keep attempting to reconnect to a host from the user's mobile device, thus occupying scarce computational resources in the device, and sometimes causing an operating system crash or a serious downgrade in overall processing capacity.

To resolve the above technical problems arising in the field of computer networking and remote collaboration, embodiments as disclosed herein provide the ability of a server hosting the teleconference to predict that one participant may be dropped based on network connectivity or a quality of the network feed from the participant. The server then implements a placeholder in the conference for the one participant, with an indication in their avatar that they have temporarily (and involuntarily) been disconnected. Further, embodiments as disclosed herein offer the ability for a participant in a teleconference to re-join the teleconference at a later time, without struggling with the application, or losing device capacity because the application is drawing too many resources in attempts to reconnect. In some embodiments, instead of a teleconference, the server may be managing a one-to-one call between two parties, and the server may detect that one of the two parties may be dropped due to a loss of network connectivity or a low quality of connectivity. In such configuration, the server then puts the participant on hold, notifies the participant, and the other participants in the call. For example, in some embodiments, the server may play to the remaining participant an alert indicating that the other participant has dropped but is expected to resurface. In some embodiments, the participant that has been dropped from the one-on-one call or the teleconference may select to be called back at that time, or wait.

Exemplary technical advantages provided by processing described in the present disclosure comprise but are not limited to: application of novel processing operations that adapt applicable computing devices to improve management of electronic collaborative communications including the identification of a quality of network feeds, proactive generation of warnings of potential connectivity issues, and an ability to efficiently manage a state of an electronic collaborative communication; automatic generation and rendering of warnings of potential connectivity issues as well as actions, updates, etc., to seamlessly manage a state of an electronic communication; an improved graphical user interface (GUI) adapted to provide notifications of potential connectivity issues and/or contextual information regarding potential connectivity issues and a state of an electronic collaborative communication as well as GUI features (in menu form and as independent GUI elements) that enable user action to be automatically taken to address potential connectivity issues; improved processing efficiency (e.g., reduction in processing cycles, saving resources/bandwidth) for computing devices (e.g., servers and client computing devices) used for provision and/or management of an electronic collaborative communication; reduction in latency experienced through applicable applications/services (e.g., SaaS applications/services including cloud-based collaboration applications or services) when managing electronic collaborative communications including proactive detection of potential connectivity issues; improved accuracy and precision in detection of potential connectivity issues that may affect operation of an electronic collaborative communication; application of novel algorithms and/or application of artificial intelligence (AI) that improve identification of a quality of a network feed during occurrence of an electronic collaborative communication; improved usability of host applications/services usable to manage an electronic collaborative communication via integration of processing described herein; and improved user productivity when conducting an electronic collaborative communication, among other technical advantages.

Example System Architecture

FIG. 1 illustrates an example architecture 100 suitable to provide a platform for warning participants of a potential loss of connectivity in a teleconference or a one-to-one call event, according to some embodiments. Architecture 100 includes servers 130 and client devices 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a network connectivity engine and a call engine that a user may access through client device 110. The user may be a participant in a teleconference or a one-to-one call from a remote location (e.g., from a mobile device in a car, and the like) hosted by the call engine in server 130. The client devices 110 may include a conference speaker phone, and mobile devices communicatively coupled with each other and with one or more servers 130 via network 150. Client devices 110, servers 130, and database 152 may have processor circuits and memory circuits to partially perform operations as disclosed herein. The network connectivity engine may monitor the quality of a network feed provided to and from each of client devices 110 during a teleconference or a one-to-one call event. Further, in some embodiments, the processor in server 130 is configured to provide warning messages and advisories to client devices 110 via network applications such as text messaging services and the like. Information related to, and instructions to handle the network connectivity engine may be stored in a database 152, accessible through network 150. For purposes of load balancing, multiple servers 130 can have memories including instructions to one or more processors and multiple servers 130 for hosting a teleconference or one-to-one calls between two or more participants or callers.

Servers 130 may include any device having an appropriate processor, memory, and communications capability for hosting the documents and applications associated with the network connectivity engine and the call engine. The call engine may be accessible by multiple participants through various client devices 110 over the network 150. Client devices 110 can be, for example, handsets, desktop computers (coupled with handsets, or standalone), mobile computers, tablet computers (e.g., including e-book readers), mobile devices (e.g., a smartphone or PDA), or any other devices having appropriate processor, memory, and communications capabilities for accessing the call engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
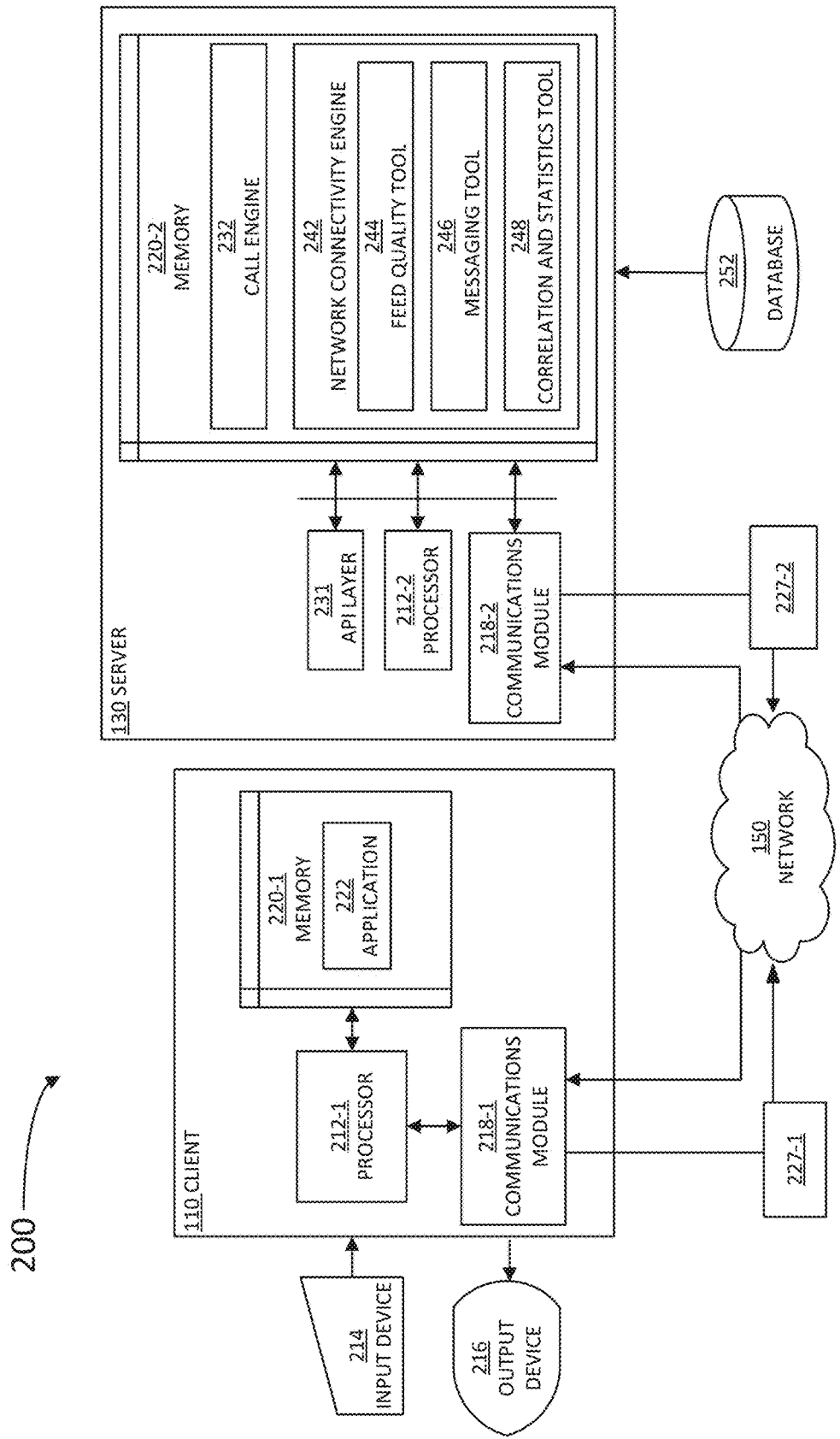
FIG. 2 is a block diagram illustrating an example server and client from the architecture of FIG. 1, according to certain aspects of the disclosure.
Figure 3A:
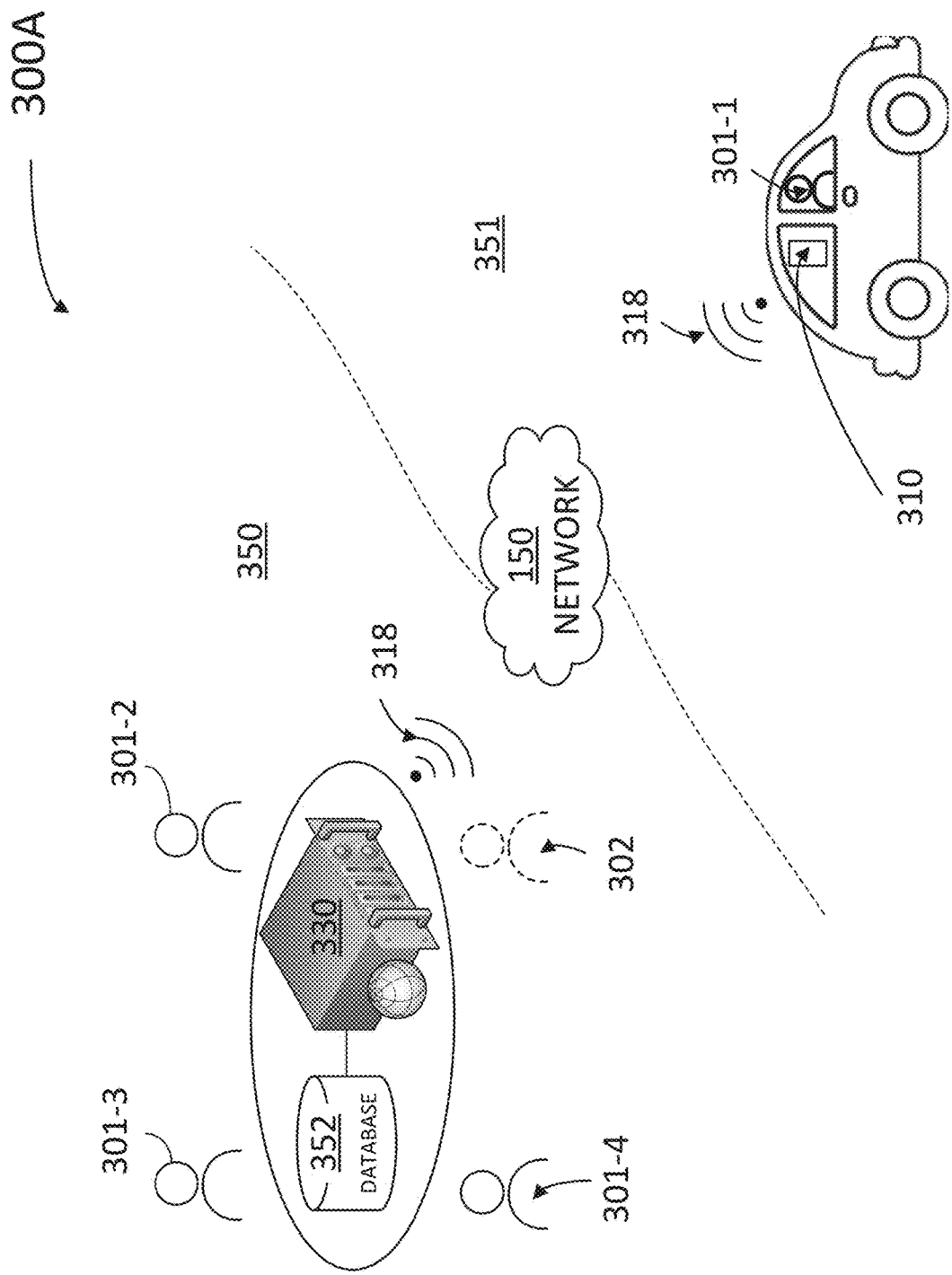
FIGS. 3A-3D illustrate vignettes of an architecture configured to provide teleconferencing services for two or more participants, according to some embodiments.
Figure 3B:
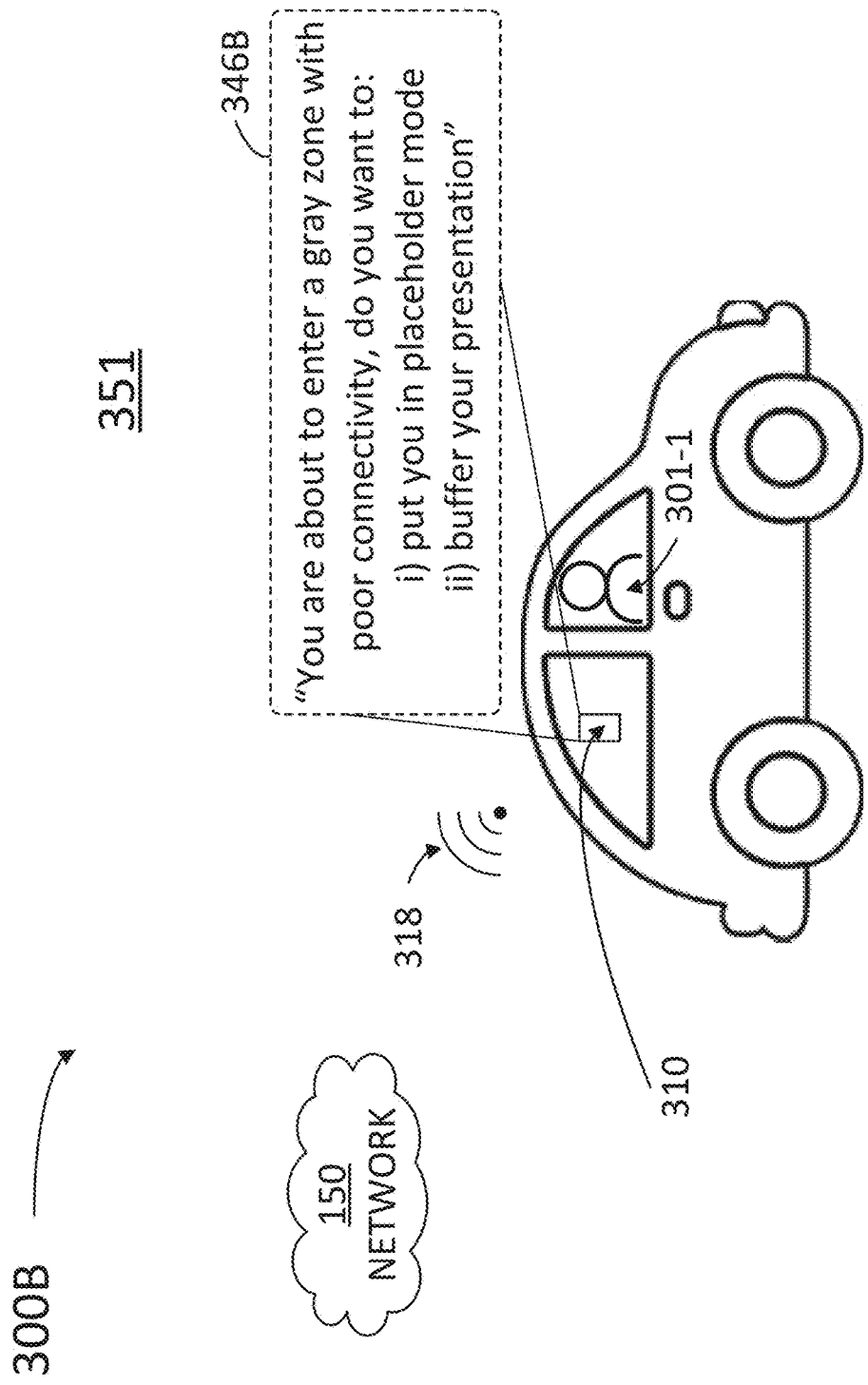
Figure 3C:
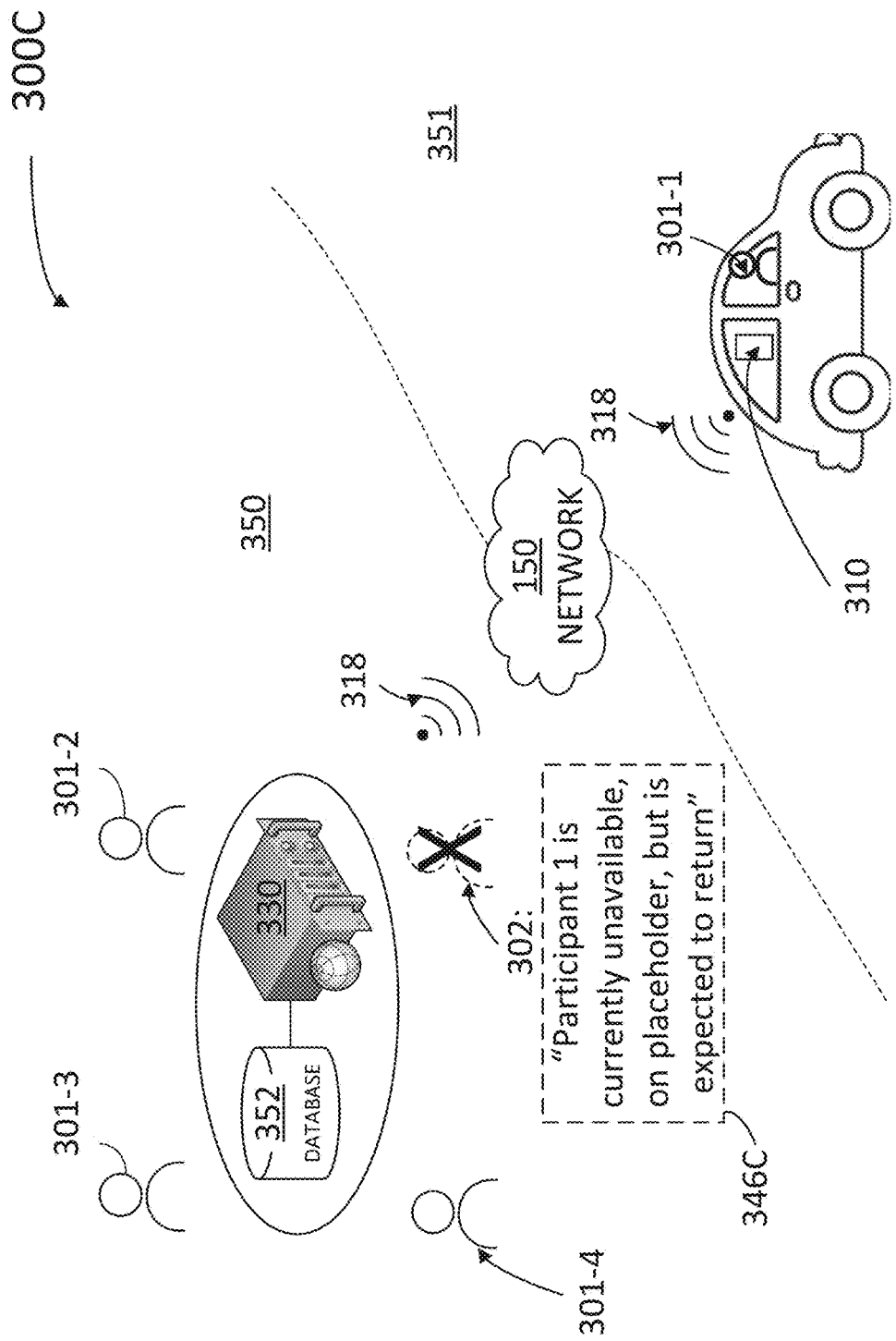
Figure 3D:
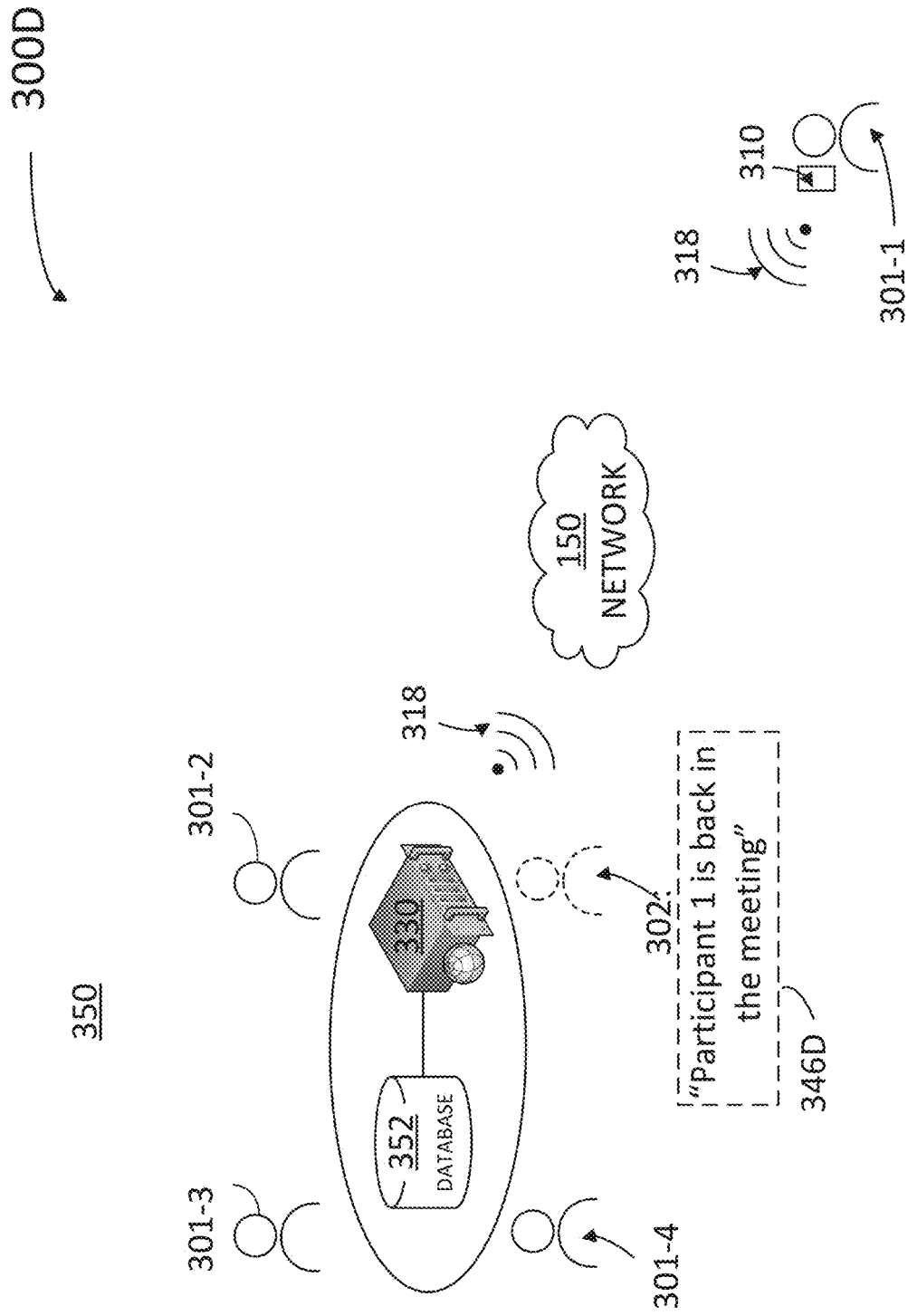
Figure 4B:
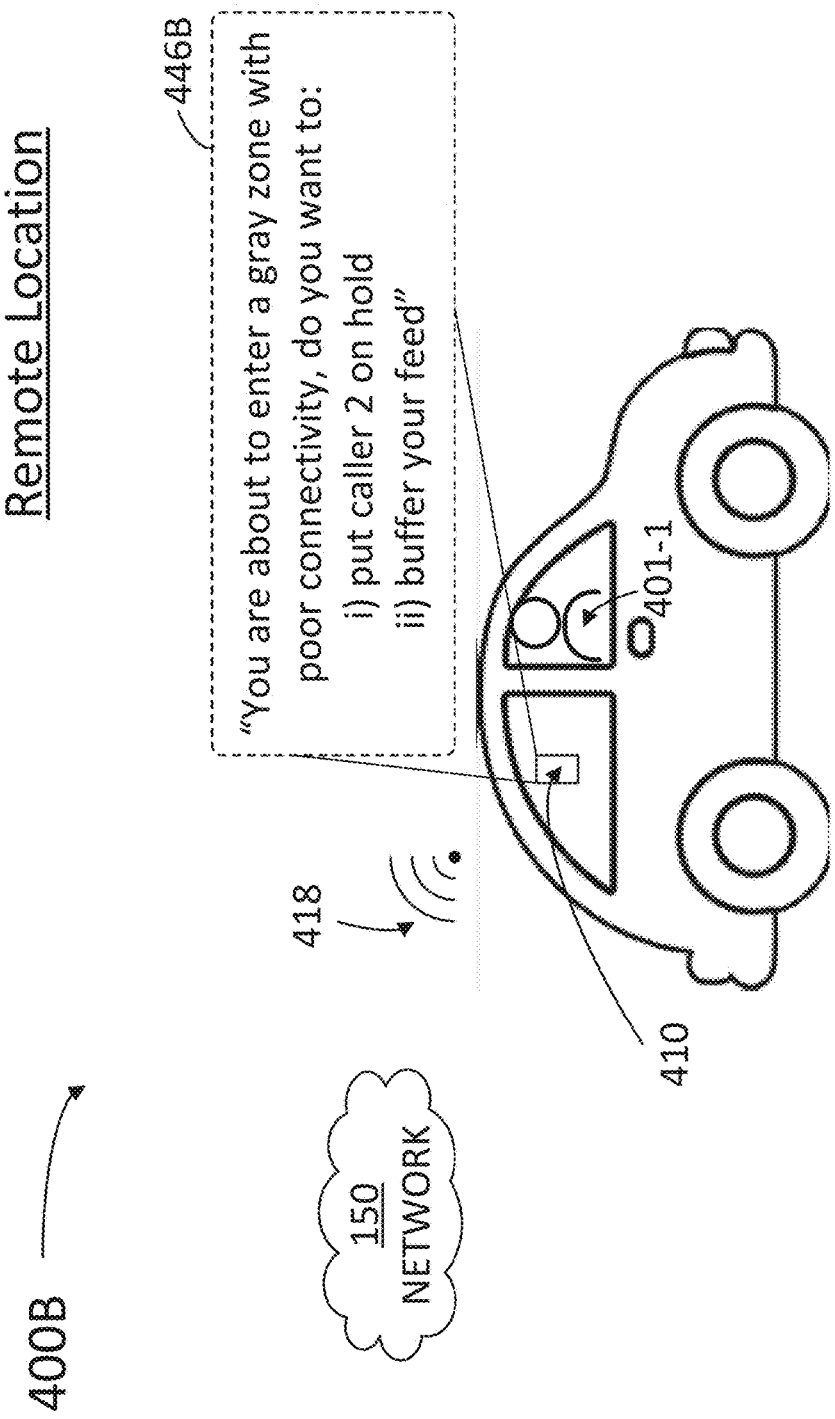
Figure 4C:
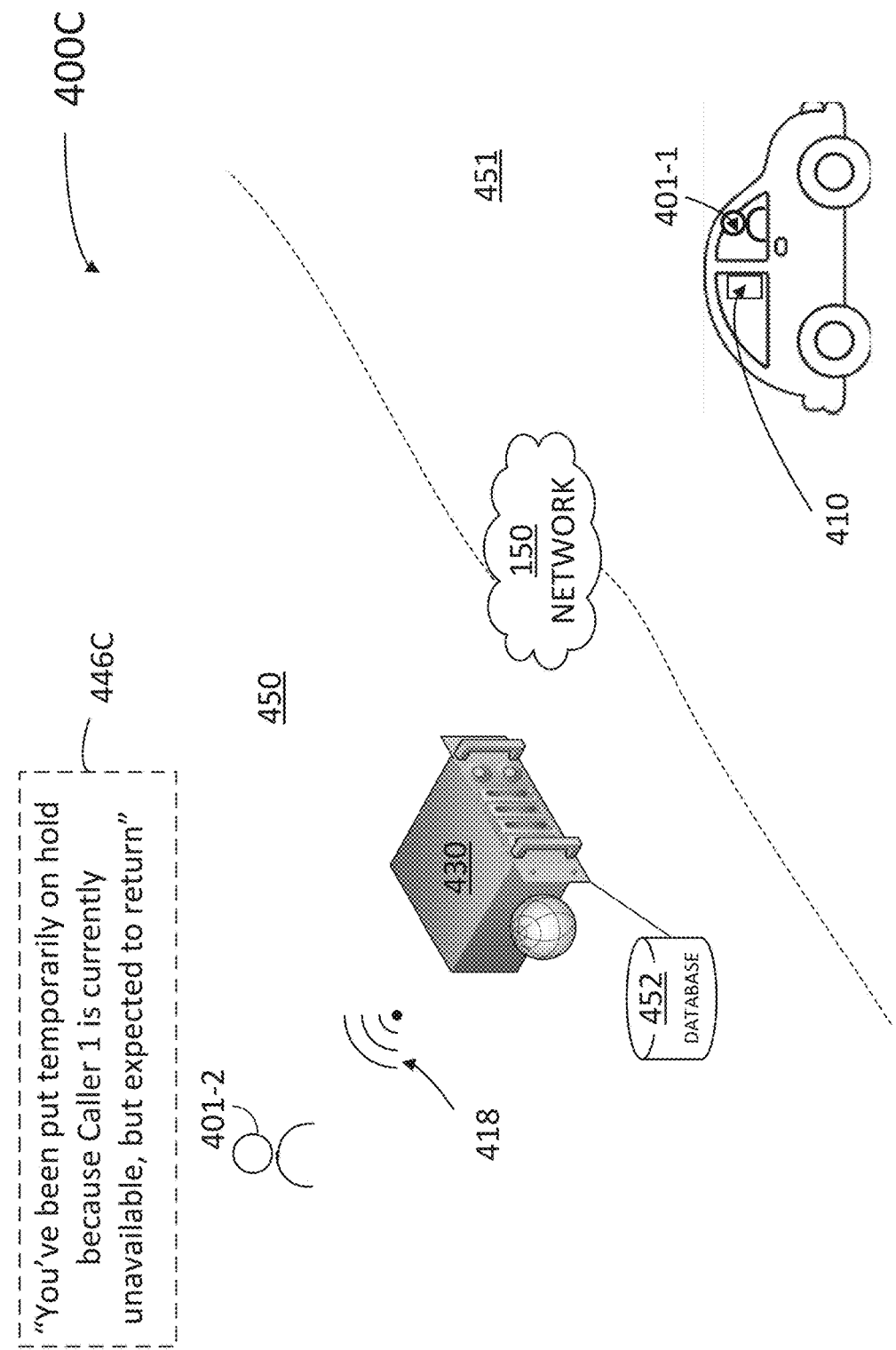

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards.

Client device 110 may be any one of a desktop computer, a laptop, or a mobile computing device. Client device 110 may include a processor 212-1 and a memory 220-1. Processor 212-1 is configured to execute instructions, such as instructions physically coded into processor 212-1, instructions received from software in memory 220-1, or a combination of both. An input device 214 and an output device 216 enable the user to interact with client device 110. Examples of input device 214 and output device 216 may include a mouse, a keyboard, a display, a touch-interactive display, and the like. A user of client device 110 may use input device 214 to submit a document or a media file to network connectivity engine 242 via a user interface of application 222. Application 222 may include displays and screenshots that enable the user of client device 110 to have access to and modify the settings of a handset in a call center, as disclosed herein.

Server 130 includes a memory 220-2, a processor 212-2, communications module 218-2, and API layer interface 231. Memory 220-2 includes a call engine 232 and a network connectivity engine 242. Call engine 232 and network connectivity engine 242 include instructions which, when executed by processor 212-2, cause server 130 to perform at least partially steps as disclosed herein. In some embodiments, network connectivity engine 242 includes instructions to communicate with application 222 to adjust, modify, update, replace, or remove a feature in the settings of client device 110 (e.g., update a network setting or address). API layer 231 handles the communications between server 130 and application 222 in client device 110. Network connectivity engine 242 may also include a feed quality tool 244, a messaging tool 246, and a correlation and statistics tool 248. Hereinafter, processors 212-1 and 212-2 will be collectively referred to as "processors 212," and memories 220-1 and 220-2 will be collectively referred to as "memories 220." In some embodiments, database 252 includes a log of prior logging sessions by each of the participants, including connectivity issues faced by each of the participants, and related data to the incident (e.g., whether the issue was resolved and how, and what was the symptom observed before a connectivity loss).

A network feed of a participant is defined as an electronic representation of a participant in analog or digital format, where the representation is displayable in an electronic collaborative communication. A network feed is broadly intended to cover any known instance where a representation of a participant is presented in an electronic format within a rendering of an electronic collaborative communication, for example, accessed via a network connection. The present disclosure is intended to be applicable to any type of representation of a participant in an electronic collaborative communication as known to one skilled in the field of art. In some embodiments, application 222 is configured to run in the background, or on display at output device 216. Application 222, running in one of client devices 110, may provide to call engine 232 a network feed 227-1 including image data and/or video data (e.g., a sequence of image data) of the participant, collected with input device 214. However, it is recognized that a network feed may comprise instances where only audio data is presented. Call engine 232 receives network feeds 227-1 from each of the teleconference or call participants and creates a feed 227-2, which is in turn distributed to all teleconference participants or callers. Accordingly, feed 227-2 may include a mosaic of videos of all participants, including a synchronized audio channel that incorporates synchronously the audio from each participant, from the network feeds 227-1 of all participants or callers. In that regard, a messaging tool 246 provides a text message to a call participant (e.g., in device 110, via application 222) and may determine that a network connectivity issue may place feed 227-1 on standby, due to network connectivity issues.

The participant may access a teleconference or call via call engine 232 through application 222 installed in memory 220-1 of client device 110. Network connectivity engine 242 may then use feed quality tool 244, messaging tool 246, and correlation and statistics tool 248 to identify a network connectivity issue with network feed 227-1.

Feed quality tool 244 is configured to assess the quality of a network connection with each of client devices 110 used by the participants on the teleconference or one-to-one call. Accordingly, feed quality tool 244 may perform signal processing of data packet 227-1 provided by client device 110. Some of the quality measures considered by feed quality tool 244 may include one or more of a count or rate of dropped (voice) packets, sequencing of packets (e.g., identification of out of order packets), a low signal intensity, a high noise level, a high jitter, long delays, a signal to noise ratio (SNR), and other parameters that may be described as "quality of service" (QoS). In some embodiments, feed quality tool 244 may determine a quality threshold such that when the quality measure of the feed meets or drops below the pre-selected quality threshold, a hold-state option is presented to the teleconference participant or caller. Feed quality tool 244 may determine the quality threshold using individual or aggregate score metrics based on the quality measures listed above (e.g., number of dropped packets, SNR, delay, QoS, and the like).

Messaging tool 246 is configured to generate selective messages to each of the participants in the teleconference or one-to-one call, based on a determination that at least one of the participants is likely to drop based on the quality of network feed 227-1. For example, messaging tool 246 may provide a message to the specific client device 110 that is likely to lose connectivity, a message like "You are about to enter a gray zone with poor connectivity, do you want to: i) put you in placeholder mode, or ii) buffer your presentation." The participant holding client device 110 may choose an option and server 130 act accordingly. Based on the participant response, messaging tool 246 may send a message to all other participants in the teleconference or one-to-one call (via feed 227-2 or directly, via a text message application to client device 110) indicating "Participant 1 is currently unavailable, on placeholder, but is expected [and is not expected] to return." If and when the lost participant is back to the teleconference or one-to-one call, messaging tool 246 may provide a message to all other participants in the teleconference or one-to-one call, indicating "Participant 1 is back in the meeting." API layer 231 provides the messages from messaging tool 246 to client device 110. The messages may include a time estimate of a network connectivity outage (e.g., 5 minutes) and potentially a rationale supporting why that estimate is provided (e.g., "entering a gray connectivity zone," or "low QoS detected," or "check your Wi-Fi connection").

Correlation and statistics tool 248 performs calculations to determine, based on a quality of network feed 227-1, the likelihood that a network connectivity will be lost. To do this, correlation and statistics tool 248 may use linear regression algorithms and non-linear regression algorithms including neural networks, machine learning (ML), and artificial intelligence (AI) algorithms. ML and AI algorithms in correlation and statistics tool 248 may be trained using historical logging data from each of client devices 110, retrieved from database 252. Exemplary algorithms and/or AI processing that are applied are trained to identify/detect a quality of a network feed in variety of ways. In some examples of the present disclosure, developers pre-select applicable metrics or parameters that apply to the detection of a quality of a network feed. It is to be recognized that developers may select to apply, individually and/or collectively, any combination of metrics or parameters described in the present disclosure. In some cases, the selection of applicable metrics or parameters is aided by prior results (training) of AI processing, which may be used to identify correlations between metrics or parameters and the impact on accurate prediction of a potential connectivity issue as well as identification of a quality of a network feed relative to pre-selected quality thresholds. Specific non-limiting examples of metrics or parameters that are applicable to evaluate a state of a quality of a network feed are subsequently described.

A pre-selected quality threshold is criteria setting utilized to generate a determination of a state of a quality of a network feed that is being evaluated during an electronic collaborative communication. An exemplary pre-selected quality threshold may be qualitive, quantitative, or a combination thereof. For instance, the type of a pre-selected quality threshold may be dependent on the type of metrics or parameters that are applied to evaluate a quality of a network feed. In examples where a pre-selected quality threshold is qualitative, the pre-selected quality threshold may be a binary value (e.g., "yes" or "no") as to whether a parameter is satisfied. In examples where a pre-selected quality threshold is quantitative, developers may set specific numerical values (e.g., numbers, percentages) or ranges of numerical values that are usable to gauge the quality of a network feed as determined in real time (or near real time). It is further recognized that developers can determine how pre-selected quality thresholds are satisfied which may vary in actual implementation. In one example, a pre-selected quality threshold may be determined to be satisfied when a quality measure exceeds a pre-determined value. In another example, a pre-selected quality threshold may be determined to be satisfied when a quality measure meets or exceeds a pre-determined value. In examples where it is being determined whether a quality metric is deteriorating, a pre-selected quality threshold may be determined to be satisfied when a quality measure is less than a pre-determined value. In other examples where it is being determined whether a quality metric is deteriorating, a pre-selected quality threshold may be determined to be satisfied when a quality measure is less than or equal to a pre-determined value. In some instances, multiple quality thresholds may be preset and applied, where the satisfaction of different thresholds may dictate the action that is applied. For instance, if a first pre-selected quality threshold is satisfied (e.g., indicating a warning of deteriorating service), a notification may be generated for a participant that provides the participant with the option to take manual action (e.g., selection of a GUI feature associated with a hold-state option) to initiate placement of a network feed on hold. In another instance, if a second pre-selected quality threshold is satisfied (e.g., indicating a significant deterioration that will result in interruption of service), an action may be automatically taken to place the network feed on hold (and subsequently notify the participant).

Non-limiting examples of metrics and/or parameters usable to evaluate the quality of a network feed are now described. In one example, identification (or detection) of a quality of a network feed comprises generating an evaluation result based on a comparison of a history log of network connections with one or more real-time metrics collected for the network feed. For instance, a history log of network connections may comprise a recounting of one or more of: timestamp data associated with detection of a quality of a network feed including applicable time windows associated with a specific evaluation; network and device-specific data pertaining to an evaluation of a network feed; application/service-specific data pertaining to an evaluation of a network feed; user-specific data pertaining to an evaluation of a network feed; geographical data pertaining to an evaluation of a network feed including determinations derived from travel of users through geographical regions; and/or metrics determined from evaluation of one or more aspects of a network feed (e.g., jitter, a latency, a signal strength, a mean opinion score, and packets loss or sequencing, among other examples). Any such data may be used to comparatively evaluate attributes pertaining to a state of a network feed in real time (or near real time) as well as determine applicable quality thresholds to set as pre-selected quality thresholds that are usable for determining the quality of the network feed. In another example, identification (or detection) of a quality of a network feed comprises generating an evaluation result based on evaluating, for the network feed, a measure of at least one of a jitter, a latency, a signal strength, packet loss/sequencing, and a mean opinion score. In yet another example, identification (or detection) of a quality of a network feed comprises generating an evaluation result based on identifying that a location of a device of the first participant is located within a no-connectivity zone. No-connectivity zones may be geographical areas that have a history of no service or low-quality service, which a user may be located in at a given point in time when a network feed evaluation occurs. Historical data such as a history log of network connections, geographical data (e.g., telecommunications mappings), and/or web page data (e.g., data from web search results) is usable to identify no-connectivity zones. In an additional example, identification/detection of a quality of a network feed comprises identifying, from a history log of network connections, one or more time windows when the first participant has previously experienced a network connectivity problem using a same client device, and correlating the one or more time windows with timestamp data associated with the network feed of the first participant. In yet another additional example, identification/detection of a quality of a network feed comprises generating an evaluation result based on evaluating a signal strength of the network feed and a number of dropped packets from the network feed.

In some embodiments, correlation and statistics tool 248 may obtain a geolocation data from client device 110, and determine a speed and direction of a teleconference participant or caller. Correlation and statistics tool 248 may then estimate a time when the teleconference participant or caller falls within a bad connectivity pocket, by correlating the geolocation information from client device 110 with a historic connectivity data for a given region or area. In some embodiments, correlation and statistics tool 248 may access an updated connectivity map provided by network 150, indicative of areas or regions where QoS may be spotty or have failures. In some embodiments, a participant with client device 110 may be geographically stationary, but may be experiencing signal issues due to weather conditions, or other temporary contingencies. Accordingly, correlation and statistics tool 248 may retrieve weather pattern information (e.g., based on location information for client device 110), broadband provider information, and the like, to determine whether there is a temporary condition that is affecting connectivity of client device 110. This type of supplemental contextual information can be used by correlation and statistics tool 248 in addition to the defined contextual signal data (e.g., signal strength, latency) to generate a relevant prediction of connectivity loss for client device 110.

In some embodiments, correlation and statistics tool 248 further modifies or updates a quality threshold initially determined by feed quality tool 244 based on historical data retrieved from database 252. Accordingly, in some embodiments, correlation and statistics tool 248 may perform a weighted average of different quality measures according to a historical pattern, to modify or update the quality threshold. For example, under certain configurations, a QoS value may be a better predictor for a dropped network connectivity than SNR, and this balance may vary from one geographical zone to another, at different times. Moreover, in some embodiments, correlation and statistics tool 248 may use weather information or a facilities report from a network provider, together with a prediction that a participant or caller will be for a period of time within a geographical area included in the facilities report. Accordingly, correlation and statistics tool 248 would weigh more heavily a location information for the participant or caller in determining a quality threshold.

In some embodiments, messaging tool 246 is configured to advise the participant that a failure is likely to occur and he/she should be placed on hold or standby from the teleconference or call. In other embodiments, automatic action is taken to place the participant on hold or standby from the teleconference call, for example, when a pre-selected quality threshold value is satisfied with respect to a deteriorating quality of a network feed (e.g., proactively recognizing a significant drop in the quality of the network feed). Execution of application 222 may be controlled by processor 212-1 in client device 110. In some embodiments, application 222 is downloaded and installed by the user into client device 110, from server 130.

FIGS. 3A-3D illustrate vignettes 300A-300D (hereinafter, collectively referred to as "vignettes 300") of an architecture configured to provide teleconferencing services to multiple participants (301-1, 301-2, 301-3, and 301-4, hereinafter, collectively referred to as "participants 301"). Participant 301-1 may be remotely connecting to a network 150 to access a server that hosts a teleconference 350. Server 330 displays Avatar 302 for participant 301-1 in the teleconference feed to which every participant 301 has access. In vignettes 300, participant 301-1 is in a remote location 351 accessing teleconference 350 via a network connection 318, and participants 301-2 through 301-4 are accessing through a virtual room. A database 352 including login history of participants 301 into prior teleconferences is communicatively coupled with server 330.

Vignette 300A illustrates that participant 301-1 is in remote location 351 (e.g., traveling by car, and about to enter a gray zone) and the network connection 318 may be lost. Server 330 is able to detect this by using geolocation capabilities in a client device 310 for participant 301-1 (e.g., a mobile phone, smartphone, and the like). In some embodiments, server 330 may access a history log in a database 352, the history log associated with participant 301-1 or with a device identifier for client device 310, and predict that network connection 318 will be lost in short order. In some embodiments, server 330 may predict the loss of network connection 318 based on a quality of service measure, or a quality of the network feed to the teleconference that is provided by client device 310 (e.g., dropped voice packets, low signal intensity, high noise level, high jitter, long delays, and the like).

Vignette 300B illustrates a notification 346B that server 330 provides to the client device (e.g., "You are about to enter a gray zone with poor connectivity, do you want to: i) Put you in placeholder mode, ii) buffer your presentation"). For example, when participant 301-1 selects to buffer a presentation, server 330 may instruct client device 310 to keep recording a speech by participant 301-1, or a video, or a slide presentation, even when participant 301-1 is placed on placeholder mode in teleconference 350. This recording may be stored as a multimedia file in client device 310, and played back to participants 301-2 through 301-4 in teleconference 350 when network connection 318 is recovered.

Vignette 300C illustrates a notification 346C from server 330 to participants 301 in teleconference 350 that participant 301-1 has been put on placeholder mode (e.g., when participant 301-1 selects option (i) above: "Participant 1 is currently unavailable, on placeholder mode, but is expected to return").

Vignette 300D illustrates the re-connecting, by server 330, of participant 301-1 into teleconference 350. In some embodiments, server 330 may display a notification 346D in Avatar 302 (e.g., "Participant 1 is back in the meeting"). In some embodiments, server 330 may replay a media file from client device 310, storing a presentation from participant 301-1 (e.g., when participant 301-1 elected option (ii), cf. notification 346B).

FIGS. 4A-4D illustrate vignettes 400A, 400B, 400C, and 400D (hereinafter, collectively referred to as "vignettes 400") of an architecture configured to provide a one-to-one call 450 to two callers (caller 401-1 on a remote, mobile device, and caller 401-2, hereinafter, collectively referred to as "callers 401"). Caller 401-1 may be in a remote location 451 connecting to a network 150 to access a server 430 that hosts one-to-one call 450 via a network connection 418. A database 452 including login history of callers 401 into prior teleconferences is communicatively coupled with server 430.

Vignette 400A illustrates caller 401-1 in a remote location 451 (e.g., traveling by car, and about to enter a gray zone) and network connection 418 may be lost. Server 430 is able to detect this by using geolocation capabilities in client device 410 for caller 401-1 (e.g., a mobile phone, smartphone, and the like). In some embodiments, server 430 may access a history log in a database 452, the history log associated with caller 401-1 or with a device identifier of client device 410, and predict that network connection 418 will be lost in short order. In some embodiments, server 430 may predict the loss of network connection 418 based on a quality of service measure, or a quality of the network feed to one-to-one call 450, provided by client device 410 (e.g., dropped voice packets, low signal intensity, high noise level, high jitter, long delays, and the like).

Vignette 400B illustrates a notification 446B that server 430 provides to client device 410 (e.g., "You are about to enter a gray zone with poor connectivity, do you want to: i) Put caller 2 on hold, ii) buffer your feed"). For example, when caller 1 selects to buffer a feed, the server may instruct the client device to keep recording an audio, or a video, or a slide presentation, even when caller 1 is not connected to the one-to-one call. This recording may be stored as a multimedia file in the client device, and played back to caller 2 when the connectivity is recovered.

Vignette 400C illustrates a notification from the server to caller 401-2 that it has been put on hold because caller 401-1 is currently unavailable (e.g., when the user selects option (i): "You've been put temporarily on hold because Caller 1 is currently unavailable, but expected to return," cf. notification 446C).

Vignette 400D illustrates the re-connecting, by server 430, of caller 401-1 into one-to-one call 450. In some embodiments, server 430 may display a notification 446D for caller 2 (e.g., "Caller 1 is back in the one-to-one call"). In some embodiments, server 430 may replay a media file from client device 410 of caller 401-1, storing a presentation, audio, or video recording from caller 1 (e.g., when caller 401-1 elected option (ii), cf. notification 446B).

Figure 5:
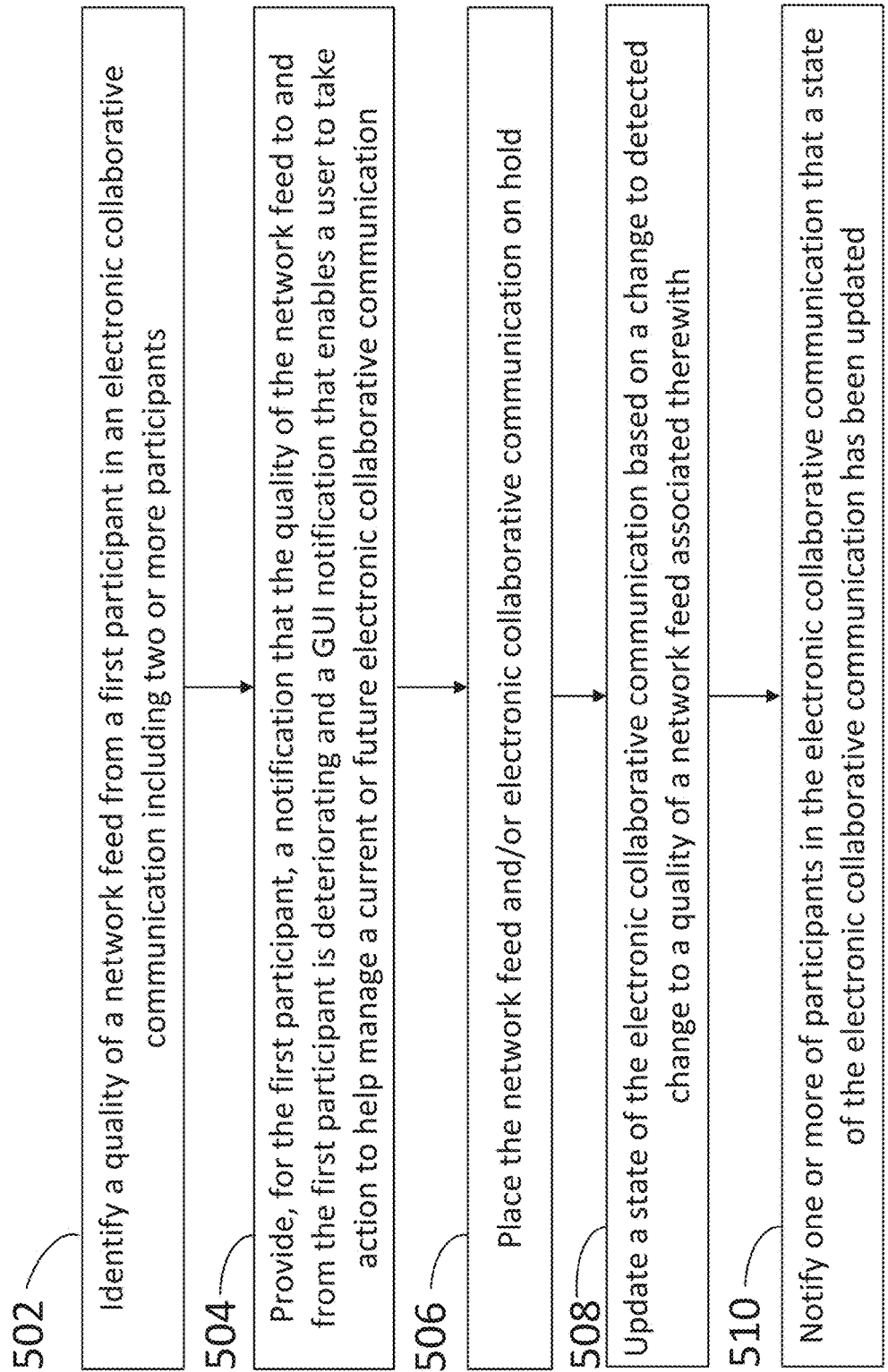
FIG. 5 is a flowchart illustrating steps in a method for warning a first participant of a potential loss of connectivity in a teleconference with multiple participants, according to some embodiments.

FIG. 5 is a flowchart illustrating steps in a method 500 for warning one or more participants of an electronic collaborative communication that one or more participants (e.g., a first participant) is experiencing (or about to experience) a potential loss of connectivity, according to some embodiments. In some embodiments, at least one or more of the steps in method 500 may be performed by one or more client devices, servers, and databases, as disclosed herein (e.g., client devices 110, 310, and 410, servers 130, 330, and 430, and databases 152, 252, 352, and 452). The server may include a call engine and a network connectivity engine (e.g., call engine 232 and network connectivity engine 242). The network connectivity engine may include tools, such as a feed quality tool, a messaging tool, and a correlation and statistics tool, as disclosed herein (e.g., feed quality tool 244, messaging tool 246, and correlation and statistics tool 248). Moreover, a method as disclosed herein may include at least one of the steps in method 500 performed in a different order, simultaneously, quasi-simultaneously, or overlapping in time. It is further to be recognized that steps described in method 500 can be applicable to claimed subject matter of any form including but not limited to: method claims, computer-implemented method claims, system claims, and (non-transitory) computer-readable medium claims, among other claim types.

Step 502 includes identifying a quality of a network feed from a first participant in an electronic collaborative communication (e.g., a teleconference) including two or more participants. In some embodiments, step 502 includes locating a position of the first participant and identifying that the position is within a no-connectivity zone. In some embodiments, step 502 includes identifying a time window when the first participant has experienced a network connectivity problem using a same client device. In some embodiments, step 502 includes evaluating a signal strength and packet loss or sequencing (e.g., a number of dropped packets) from the network feed. In some embodiments, step 502 includes comparing a history log of network connections for the network feed with a real-time metric of the network feed. In some embodiments, step 502 includes determining a measure of at least one of a jitter, a latency, a signal strength, and a mean opinion score, of the network feed.

Non-limiting examples of identification or detection of a quality of a network feed are now described. In one example, identification (or detection) of a quality of a network feed comprises generating an evaluation result based on a comparison of a history log of network connections with one or more real-time metrics collected for the network feed. For instance, a history log of network connections may comprise a recounting of one or more of: timestamp data associated with detection of a quality of a network feed including applicable time windows associated with a specific evaluation; network and device-specific data pertaining to an evaluation of a network feed; application/service-specific data pertaining to an evaluation of a network feed; user-specific data pertaining to an evaluation of a network feed; geographical data pertaining to an evaluation of a network feed including determinations derived from travel of users through geographical regions; and/or metrics determined from evaluation of one or more aspects of a network feed (e.g., jitter, a latency, a signal strength, a mean opinion score, and packets loss or sequencing, among other examples). Any such data may be used to comparatively evaluate attributes pertaining to a state of a network feed in real time (or near real time) as well as determine applicable quality thresholds to set as pre-selected quality thresholds that are usable for determining the quality of the network feed. In another example, identification (or detection) of a quality of a network feed comprises generating an evaluation result based on evaluating, for the network feed, a measure of at least one of a jitter, a latency, a signal strength, packet loss/sequencing, and a mean opinion score. In yet another example, identification (or detection) of a quality of a network feed comprises generating an evaluation result based on identifying that a location of a device of the first participant is located within a no-connectivity zone. No-connectivity zones may be geographical areas that have a history of no service or low-quality service, which a user may be located in at a given point in time when a network feed evaluation occurs. Historical data such as a history log of network connections, geographical data (e.g., telecommunications mappings), and/or web page data (e.g., data from web search results) is usable to identify no-connectivity zones. In an additional example, identification/detection of a quality of a network feed comprises identifying, from a history log of network connections, one or more time windows when the first participant has previously experienced a network connectivity problem using a same client device, and correlating the one or more time windows with timestamp data associated with the network feed of the first participant. In yet another additional example, identification/detection of a quality of a network feed comprises generating an evaluation result based on evaluating a signal strength of the network feed and a number of dropped packets from the network feed.

Furthermore, it is to be recognized that additional layers of evaluation may be programmed to be applied, such as determinations as to whether action should be automatically taken on behalf of a user or whether a GUI notification should be provided to a user to take manual action with respect to identification of a potential network connectivity issue. This may occur based on evaluation results by the correlation and statistics tool 248 (FIG. 2), for example, where quality threshold determinations may indicate that automatic action is to be taken.

Step 504 includes providing, for the first participant (e.g., that is experiencing a potential or predicted network connectivity issue), a notification that the quality of the network feed to and from the first participant is deteriorating and a GUI notification that enables a user to take action to help manage a current or future electronic collaborative communication. In some examples, a GUI notification comprises a single GUI feature that, when selected, enables immediate action to be taken to manage a state of an electronic collaborative communication (e.g., a teleconference). For instance, a hold-state option is presented as a graphical user interface feature, that when selected, is configured to place an electronic collaborative communication (e.g., teleconference or one-to-one call) on hold until the quality improves above a pre-selected quality threshold. In further examples, a menu of options is presented that may include more than one option for a participant to take proactive action to manage a state of an electronic collaborative communication. For instance, the menu of options may comprise a hold-state option that enables the network feed of a participant experiencing connectivity issues to be placed on hold (e.g., a placeholder mode). In another example, a GUI option may be presented to enable a user to suspend the electronic collaborative communication in view of potential connectivity issues until the quality improves above a pre-selected quality threshold. In some further embodiments, the menu of options comprises a switching option configured to enable switching of the network feed to an alternative client device associated with a participant. When the switching option is selected (or automatically applied), a network feed associated with an alternative computing device (e.g., alternative client device) is applied. For instance, a teleconference may be updated to add/include a representation of the network feed associated with an alternative computing device (alternative client device). In some technical instances, this may occur in addition to a representation of a network feed of another computing device of a participant, for example, one which shows that network feed was placed on hold. In other instances, a representation of a network feed of an alternative computing device may be added to a teleconference to replace an original representation of a network feed (e.g., one which shows that network feed was placed on hold) in the teleconference. When the switching option is selected, step 504 further includes joining the network feed from the alternative client device into the teleconference feed. In some embodiments, step 504 includes instructing a client device with the participant to buffer the network feed while the first participant is in the 'placeholder' mode; saving a buffered network feed as a multimedia file; and downloading the multimedia file from the client device when the quality of the network feed improves above the pre-selected quality threshold, wherein the multimedia file includes an audio recording of the first participant and a transcript of the audio recording of the first participant.

In alternative examples, the notification provided in step 504 may be an informational notice to a participant that an automatic action has been taken automatically on behalf of the user to attempt to manage the state of the electronic collaborative communication relative to identification of a potential network connectivity issue. As previously described, there are some technical instances where a network feed may be placed on hold and/or an electronic collaborative communication suspended. As identified previously, this may occur based on evaluation results by the correlation and statistics tool 248 (FIG. 2), for example, where quality threshold determinations may indicate that automatic action is to be taken. In further examples, said notification may comprise GUI features that enable the user to further manage a state of an electronic collaborative communication. For instance, a participant may wish to undue the automatic placement of its network feed on hold, and/or resume a communication (if able to).

Step 506 includes placing the network feed and/or electronic collaborative communication on hold. As indicated above, there may be instances where a network feed is automatically placed on hold as well as other instances where hold placement occurs in response to receiving an indication of a GUI selection made through a GUI notification, for example, that was presented on a computing device associated with a participant. In examples where a network feed and/or communication are placed on hold in response to a selection made through a GUI notification (e.g., a selection of a hold-state option is made), step 506 occurs based on the trigger of receiving an indication of a selection made (e.g., via the hold-state option). Indication is intended to mean a notice received at a computing device (e.g., server) that is taking subsequent action (e.g., placing a network feed on hold), which may be a different computing device (e.g., client computing device) that received the GUI notification and subsequent selection.

Moreover, step 506 may further comprise notifying one or more of the participants in the electronic collaborative communication (e.g., teleconference) that the first participant has been placed on hold and/or the communication suspended due to potential network connectivity issues. Notifying of the one or more of the multiple participants may further comprise providing one or more of: an audible signal in the teleconference, a visual indication in the teleconference, and a textual indication in the teleconference. In some embodiments, step 506 includes providing an audible signal in the teleconference feed, and a text-based notification to the participants. In some embodiments, the multiple participants include at least a second participant, and step 506 includes notifying the second participant that the teleconference feed will be suspended until further notice; and establishing the teleconference feed when the quality of the network feed improves above the pre-selected quality threshold.

In further examples, notification may occur via other modalities associated with a user profile of a participant. For instance, a determination may be made to send a participant a text message over a cellular network when it is detected that a Wi-Fi connection, used to connect a participant to a teleconference, has been interrupted. In examples where a cloud-based communication application/service is being used, a notification may occur through a modality such as chat/messaging or other GUI notification. In other examples, the notifying comprises providing a notification to the second caller that comprises one or more of: a time estimate for resolution of a network connectivity issue, and a rationale supporting why that time estimate is provided. A time estimate for resolution of a network connectivity issue and a rationale supporting why the time estimate is provided are derived from a result of contextual analysis applied by the correlation and statistics tool 248 as previously described in the present disclosure. In some examples, time estimates may be updated in real time (or near real time) to reflect a present state of a hold/suspension. In further instances, time estimates may further comprise timestamp data associated with an initial notification. For instance, an initial message providing a time estimate may have occurred at a given point in time and the other participants can use that to gain a real-time understanding of when a potential connectivity issue is to be expected to be resolved.

Step 508 comprises updating a state of the electronic collaborative communication based on a change to detected change to a quality of a network feed associated therewith. For instance, a specific network feed within and/or an entirety of the electronic collaborative communication may be updated based on a change to the quality of network feeds for one or more participants in a communication. In one example, step 508 comprises updating, within the electronic collaborative communication (e.g., a teleconference), a representation of the network feed of a participant (e.g., of the first participant that was placed on hold) to indicate a return from hold. This may occur after/when a determination is made that the quality of the network feed satisfies the pre-selected quality threshold. As indicated previously, a continuous and/or periodic evaluation of a quality of a network feed may be conducted after a network feed is placed on hold and/or communication is suspended. In examples, a subsequent evaluation of a quality of a network feed may occur using the same quality threshold determinations or may vary to include any such evaluation that is described herein. In some technical instances, a quality threshold determination may be made as to whether a quality of a network feed is improving (or deteriorating). One or more quality thresholds may be utilized to evaluate whether a quality of a network feed is sufficient to resume a communication.

A representation of a network feed is intended to be a rendering of a feed of a participant in the electronic collaborative communication. The term representation is used herein to highlight different technical instances that may apply. In one example, a representation of a network feed may be updated where an existing network feed (e.g., one that the participant originally used to join a communication) is restored or brought back into the electronic collaborative communication. In another example, a representation of a network feed may be a new network feed that is created and added to the electronic collaborative communication. For instance, a new network feed may be added in addition to a previous network feed of a participant or to replace a previous network feed of a participant. It is to be recognized that a new network feed may be rendered from the same computing device that a participant used to create an original network feed or may be rendered from an alternative computing device (e.g., alternative client computing device).

In one embodiment, step 508 reconnects network feeds of a first participant (e.g., the first caller and a second participant, e.g., the second caller) when a determination is made that the quality of the network feed of the first caller satisfies the pre-selected quality threshold. For example, the updating of the video feed comprises re-establishing the teleconference between the multiple participants when the quality of the network feed associated with the first participant satisfies the pre-selected quality threshold. A representation of said network feed may then be updated in a representation of the teleconference.

In another example, step 508 comprises updating an entire state of an electronic collaborative communication. In an example where a teleconference was suspended due to a potential network connectivity issue, the teleconference may be resumed with an active network feed for all participants.

Step 510 includes notifying one or more of participants (e.g., one or more of the multiple participants) in the electronic collaborative communication that a state of the electronic collaborative communication has been updated. Notifying of the one or more of the multiple participants may further comprise providing one or more of: an audible signal in the teleconference, a visual indication in the teleconference, and a textual indication in the teleconference. In further examples, notification may occur via other modalities associated with a user profile of a participant. In some examples, a notification may comprise an updated time estimate and/or rationale as to a state of resolution of a connectivity issue. For instance, a user may be driving though multiple no-connectivity zones, where that information may be useful to other participants in conjunction with an updated time estimate for resolution.

Figure 6:
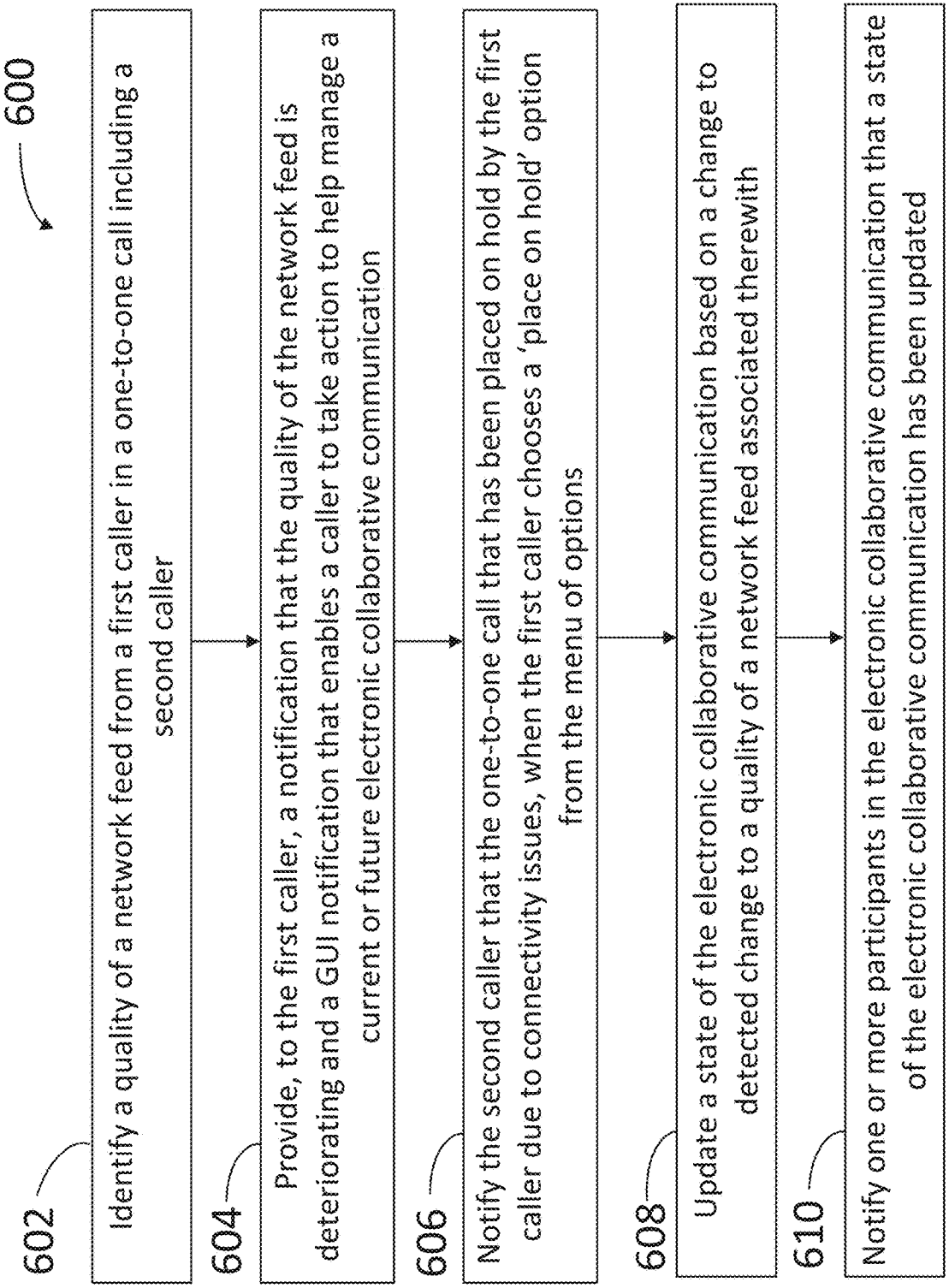
FIG. 6 is a flowchart illustrating steps in a method for warning a first caller of a potential loss of connectivity in a one-to-one call with a second caller, according to some embodiments.

FIG. 6 is a flowchart illustrating steps in a method 600 for warning one or more participants of an electronic collaborative communication that one or more participants (e.g., a first caller) of a potential loss of connectivity in a one-to-one call with another participant (e.g., a second caller), according to some embodiments. In some embodiments, at least one or more of the steps in method 600 may be performed by one or more client devices, servers, and databases, as disclosed herein (e.g., client devices 110, 310, and 410, servers 130, 330, and 430, and databases 152, 252, 352, and 452). The server may include a call engine and a network connectivity engine (e.g., call engine 232 and network connectivity engine 242). The network connectivity engine may include tools, such as a feed quality tool, a messaging tool, and a correlation and statistics tool, as disclosed herein (e.g., feed quality tool 244, messaging tool 246, and correlation and statistics tool 248). Moreover, a method as disclosed herein may include at least one of the steps in method 600 performed in a different order, simultaneously, quasi-simultaneously, or overlapping in time. Moreover, a method as disclosed herein may include at least one of the steps in method 600 performed in a different order, simultaneously, quasi-simultaneously, or overlapping in time. It is further to be recognized that steps described in method 600 can be applicable to claimed subject matter of any form including but not limited to: method claims, computer-implemented method claims, system claims, and (non-transitory) computer-readable medium claims, among other claim types.

Step 602 includes identifying a quality of a network feed from the first caller in the one-to-one call including the second caller. In some embodiments, step 602 includes comparing a history log of network connections for the network feed with a real-time metric of the network feed. In some embodiments, step 602 includes determining a measure of at least one of a jitter, a latency, a strength and a mean opinion score, of the network feed. In some embodiments, step 602 includes locating a position of the first caller and identifying that the position is within a no-connectivity zone. Further examples of identification/detection of a quality of a network feed including specific applied evaluations have been described in the foregoing description of the present disclosure and are further applicable to method 600.

Step 604 includes providing, for the first caller, a notification that the quality of the network feed is deteriorating and providing a GUI notification that enables a caller to take action to help manage a current or future electronic collaborative communication. Non-limiting examples of GUI notifications have been described in the foregoing description of the present disclosure and are further applicable to method 600. For example, a hold-state option and/or a menu of options may be presented in a GUI notification presented to a caller via a computing device of the caller.

Step 606 includes notifying the second caller that the one-to-one call has been placed on hold by the first caller due to connectivity issues, when the first caller chooses the 'place on hold' option from the menu of options. In some embodiments, step 606 includes providing an audible signal in the one-to-one call, and a text message. In one example, step 606 comprises providing a notification to the second caller that comprises one or more of: a time estimate for resolution of a network connectivity issue, and a rationale supporting why that time estimate is provided.

Step 608 comprises updating a state of the electronic collaborative communication based on a change to detected change to a quality of a network feed associated therewith. Non-limiting examples of updates to a state of an electronic collaborative communication have been described in the foregoing description of the present disclosure and are further applicable to method 600. In one example, step 608 comprises bringing the network feed from the first caller into the one-to-one call when the quality of the network feed improves above the pre-selected quality threshold.

Step 610 comprises notifying one or more of participants (e.g., one or more of the multiple participants) in the electronic collaborative communication that a state of the electronic collaborative communication has been updated. Non-limiting examples of notifications of updates to a state of an electronic collaborative communication have been described in the foregoing description of the present disclosure and are further applicable to method 600. In one example, step 610 comprises notifying the second caller in the one-to-one call that the network feed from the first caller is back onto the on-to-one call. In some examples, a notification may comprise an updated time estimate and/or rationale as to a state of resolution of a connectivity issue. For instance, a user may be driving through multiple no-connectivity zones, where that information may be useful to other participants in conjunction with an updated time estimate for resolution.

Hardware Overview

Figure 7:
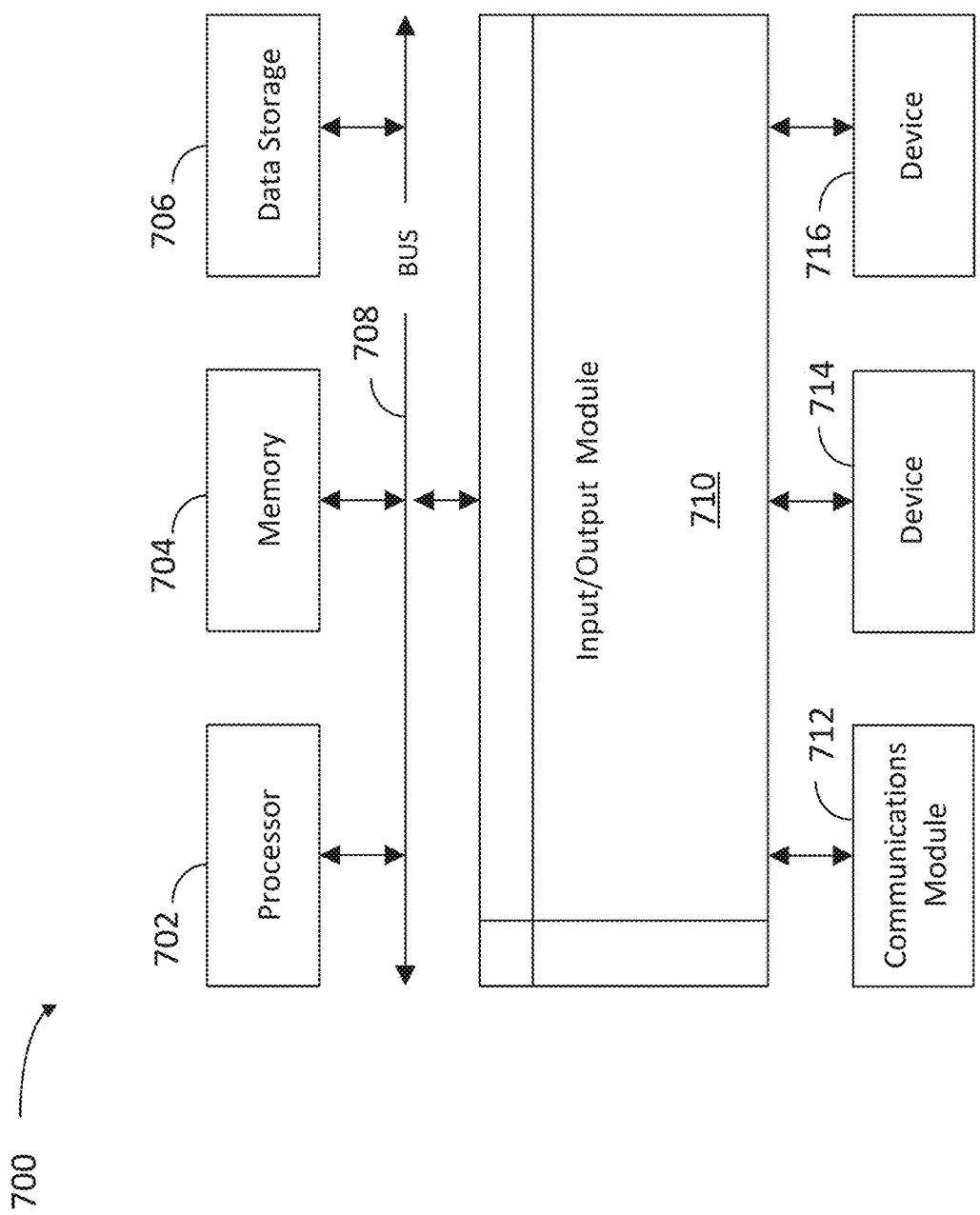
FIG. 7 is a block diagram illustrating an example computer system with which the client and server of FIGS. 1 and 2, and the methods of FIGS. 5 and 6 can be implemented, according to some embodiments.

FIG. 7 is a block diagram illustrating an exemplary computer system 700 with which the client device 110 and server 130 of FIGS. 1 and 2, and the methods of FIGS. 5 and 6 can be implemented. In certain aspects, the computer system 700 may be implemented using hardware or a combination of software and hardware, either in a dedicated server, or integrated into another entity, or distributed across multiple entities.

Computer system 700 (e.g., client device 110 and server 130) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, a code that creates an execution environment for the computer program in question, e.g., code that constitutes processor firmware, a protocol stack, a database management system, an operating system, or a combination of one or more of them stored in an included memory 704 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, a special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 218) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the client device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship with each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that include bus 708. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "include" as "include" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

RECITATION OF EMBODIMENTS

Embodiment I: In one embodiment of the present disclosure, a computer-implemented method is described that comprises identifying a quality of a network feed from a first participant in an electronic collaborative communication (e.g., teleconference) including multiple participants. A notification is provided (e.g., to the first participant) indicating that the quality of the network feed is deteriorating and further provides a menu of options that comprises a hold-state option configured to enable placement of the network feed on hold until the quality of the network feed is determined to satisfy a pre-selected quality threshold. The computer-implemented method also comprises placing the network feed of the first participant on hold in response to an indication of a selection made via the hold-state option. One or more of the multiple participants in the electronic collaborative communication are notified that the network feed of the first participant has been placed on hold in response to the indication of the selection made via the hold-state option. A representation of the network feed of the first participant is then updated, within the electronic collaborative communication, to indicate a return from hold when a determination is made that the quality of the network feed satisfies the pre-selected quality threshold. The one or more of the multiple participants in the electronic collaborative communication are then notified that the representation of the network feed of the first participant is updated within the electronic collaborative communication.

Embodiment II: According to another embodiment of the present disclosure, a computer-implemented method is described that comprises identifying a quality of a network feed from a first caller in a one-to-one call including a second caller. A notification is provided, to the first caller, indicating that the quality of the network feed is deteriorating and a graphical user interface feature is presented for a user that enables the user to take action to manage a state of the one-on-one call relative to the potential connectivity issue. In one example, a hold-state option presented as a graphical user interface feature, that when selected, is configured to place the one-to-one call on hold until the quality improves above a pre-selected quality threshold. In another example, a GUI menu (e.g., menu of options) is presented to the first caller that comprises a hold-state option presented as a graphical user interface feature, that when selected, is configured to place the one-to-one call on hold until the quality improves above a pre-selected quality threshold. In response to receiving an indication of a selection made via an exemplary hold-state option, the one-to-one call is placed on hold. The second caller is then notified that the one-to-one call has been placed on hold by the first caller due to a connectivity issue in response to receiving the indication of the selection made via the hold-state option. A state of the one-to-one call is then updated in response to a result of a subsequent quality evaluation of a quality of the network feed. For example, the one-to-one call is updated to reconnect feeds of the first caller and the second caller when a determination is made that the quality of the network feed of the first caller satisfies the pre-selected quality threshold. For example, the notifying comprises notifying the second caller in the one-to-one call that the network feed of the first caller has been re-established, and wherein notifying the second caller comprises providing one or more of: an audible signal associated with the one-to-one call, a visual indication in a representation of the one-to-one call, and a textual indication in the representation of the one-to-one call.

Embodiment III: A computer-implemented method, comprising identifying a quality of a network feed of a first participant in a collaborative communication (e.g., teleconference) including multiple participants. Further, the computer-implemented method comprises determining that the quality of the network feed of the first participant has deteriorated below a pre-selected quality threshold. Additionally, the computer-implemented method automatically places the network feed of the first participant on hold based on a determination that the quality of the network feed has deteriorated below the pre-selected quality threshold. Further, in response to the automatically placing, a notification is automatically provided, to one or more of the multiple participants of the teleconference, indicating that the network feed of the first participant has been placed on hold. Subsequently, a state of the collaborative communication (e.g., teleconference) automatically updates for the multiple participants. In one example, the automatically updating of the state of the teleconference comprises suspending the teleconference. In further examples, the automatically updating of the state of the teleconference further comprises: re-establishing the teleconference when the quality of the network feed is determined to meet or exceed the pre-selected quality threshold, and wherein the re-establishing comprises updating, within the teleconference, a representation of the network feed of the first participant to indicate a return from hold for the first participant.

Embodiments as disclosed herein may further include, in addition to the features in Embodiments I, II, and III a combination of any one of the following elements, in any order and number.

Element 1, wherein identifying a quality of a network feed from a first participant in a teleconference including multiple participants includes generating a quality evaluation result by comparing a history log of network connections for the network feed with a real-time metric of the network feed. Element 2, wherein identifying a quality of a network feed from a first participant in the teleconference includes generating an evaluation result for the quality of the network feed based on an determining for the network feed one or more of: a measure of at least one of a jitter, a latency, a signal strength, packet loss and/or sequencing, and a mean opinion score. Element 3, wherein identifying a quality of a network feed includes generating an evaluation result based on identifying that a location of a device of the first participant is located within a no-connectivity zone. Element 4, wherein notifying the participants in the teleconference that the first participant has been put on hold comprises: providing one or more of: an audible signal in the teleconference, a visual indication in the teleconference, and a textual indication in the teleconference. Element 5, wherein identifying the quality of the network feed comprises identifying, from a history log of network connections, one or more time windows when the first participant has previously experienced a network connectivity problem using a same client device, and correlating the one or more time windows with timestamp data associated with the network feed of the first participant. Element 6, wherein identifying a quality of the network feed includes evaluating a signal strength and a number of dropped packets from the network feed. Element 7, wherein the menu of options comprises a switching option configured to enable switching of the network feed to an alternative client device associated with the first participant, and wherein the updating of the network feed of the first participant from hold comprises adding a network feed associated with the alternative client device into the teleconference in response to an indication of a selection of the switching option. Element 8, further including instructing a client device with the participant to buffer the network feed while the first participant is the hold-state option; saving a buffered network feed as a multimedia file; and downloading the multimedia file from the client device when the quality of the network feed improves above the pre-selected threshold, wherein the multimedia file includes an audio recording of the first participant and a transcript of the audio recording of the first participant. Element 9, wherein the multiple participants include at least a second participant, and notifying that the first participant has been put on hold includes notifying the second participant that the teleconference feed will be suspended until further notice; and establishing the teleconference feed when the quality of the network feed improves above the pre-selected quality threshold.

What is claimed is:

1. A computer-implemented method, comprising:
   identifying a quality of a network feed of a first participant in a teleconference including multiple participants;
   providing, to the first participant, a notification that the quality of the network feed is deteriorating and a menu of options that comprises a hold-state option configured to enable placement of the network feed on hold until the quality of the network feed is determined to satisfy a pre-selected quality threshold;
   placing the network feed of the first participant on hold in response to an indication of a selection made via the hold-state option;
   notifying one or more of the multiple participants in the teleconference that the network feed of the first participant has been placed on hold in response to the indication of the selection made via the hold-state option;
   updating, within the teleconference, a representation of the network feed of the first participant to indicate a return from hold when a determination is made that the quality of the network feed satisfies the pre-selected quality threshold; and
   notifying the one or more of the multiple participants in the teleconference that the representation of the network feed of the first participant is updated within the teleconference.

2. The computer-implemented method of claim 1, wherein identifying the quality of the network feed comprises generating an evaluation result based on comparing a history log of network connections with one or more real-time metrics collected for the network feed.

3. The computer-implemented method of claim 1, wherein identifying the quality of the network feed of the first participant comprises generating an evaluation result based on evaluating, for the network feed, a measure of at least one of a jitter, a latency, a strength, and a mean opinion score.

4. The computer-implemented method of claim 1, wherein identifying the quality of the network feed comprises generating an evaluation result based on identifying that a location of a device of the first participant is located within a no-connectivity zone.

5. The computer-implemented method of claim 1, wherein notifying of the one or more of the multiple participants comprises providing one or more of: an audible signal in the teleconference, a visual indication in the teleconference, and a textual indication in the teleconference.

6. The computer-implemented method of claim 1, wherein identifying the quality of the network feed comprises identifying, from a history log of network connections, one or more time windows when the first participant has previously experienced a network connectivity problem using a same client device, and correlating the one or more time windows with timestamp data associated with the network feed of the first participant.

7. The computer-implemented method of claim 1, wherein identifying the quality of the network feed comprises generating an evaluation result based on evaluating a signal strength of the network feed and a number of dropped packets from the network feed.

8. The computer-implemented method of claim 1, wherein the menu of options comprises a switching option configured to enable switching of the network feed to an alternative client device associated with the first participant, and wherein the updating of the network feed of the first participant from hold comprises adding a network feed associated with the alternative client device into the teleconference in response to an indication of a selection of the switching option.

9. The computer-implemented method of claim 1, further comprising: instructing a client device associated with the first participant to buffer the network feed while the first participant is on hold; saving a buffered network feed as a multimedia file; and downloading the multimedia file from the client device when the quality of the network feed improves above the pre-selected quality threshold, wherein the multimedia file comprises an audio recording of the first participant and a transcript of the audio recording of the first participant.

10. The computer-implemented method of claim 1, wherein the one or more of the multiple participants comprises at least a second participant, and wherein the notifying comprises notifying the second participant that a teleconference feed is suspended until further notice, and wherein the updating of a video feed comprises re-establishing the teleconference between the multiple participants when the quality of the network feed associated with the first participant satisfies the pre-selected quality threshold.

11. A system, comprising:
one or more processors; and
a memory storing instructions which, when executed by the one or more processors, cause the system to perform operations, comprising:
identify a quality of a network feed of a first participant in a teleconference including multiple participants;
provide, to the first participant, a notification that the quality of the network feed is deteriorating and a menu of options that comprises a hold-state option configured to place the network feed on hold until the quality of the network feed satisfies a pre-selected quality threshold;
place the network feed of the first participant on hold in response to an indication of a selection made via the hold-state option;
notify one or more of the multiple participants in the teleconference that the first participant has been put on hold in response to the indication of the selection made via the hold-state option;
update, within the teleconference, a representation of the network feed of the first participant from hold when a determination is made that the quality of the network feed satisfies the pre-selected quality threshold; and
notify the one or more of the multiple participants in the teleconference that the representation of the network feed of the first participant is updated within the teleconference.

12. The system of claim 11, wherein the one or more processors, to identify the quality of the network feed of the first participant, execute instructions to generate an evaluation result based on comparing a history log of network connections with one or more real-time metrics collected for the network feed.

13. The system of claim 11, wherein the one or more processors, to identify the quality of the network feed of the first participant, execute instructions to generate an evaluation result based on evaluating, for the network feed, a measure of at least one of a jitter, a latency, a strength, and a mean opinion score.

14. The system of claim 11, wherein the one or more processors, to identify the quality of the network feed of the first participant, execute instructions to generate an evaluation result based on identifying that a location of a device of the first participant is located within a no-connectivity zone.

15. The system of claim 11, wherein the one or more processors, to notify the one or more of the multiple participants in the teleconference that the first participant has been put on hold, execute instructions to provide one or more of: an audible signal in the teleconference, a visual indication in the teleconference, and a textual indication in the teleconference.

16. A computer-implemented method, comprising:
identifying a quality of a network feed from a first caller in a one-to-one call including a second caller;
providing, to the first caller, a notification that the quality of the network feed is deteriorating and a hold-state option presented as a graphical user interface feature, that when selected, is configured to place the one-to-one call on hold until the quality improves above a pre-selected quality threshold;
placing the one-to-one call on hold in response to receiving an indication of a selection made via the hold-state option;
notifying the second caller that the one-to-one call has been placed on hold by the first caller due to a connectivity issue in response to receiving the indication of the selection made via the hold-state option; and
updating the one-to-one call to reconnect feeds of the first caller and the second caller when a determination is made that the quality of the network feed of the first caller satisfies the pre-selected quality threshold.

17. The computer-implemented method of claim 16, wherein the identifying the quality of the network feed of the first caller comprises generating an evaluation result based on comparing a history log of network connections with one or more real-time metrics of the network feed.

18. The computer-implemented method of claim 16, wherein the notifying the second caller that the one-to-one call has been placed on hold comprises providing a notification to the second caller that comprises one or more of: a time estimate for resolution of a network connectivity issue, and a rationale supporting why that time estimate is provided.

19. The computer-implemented method of claim 16, wherein the identifying the quality of the network feed comprises generating an evaluation result based on identifying that a location of a device of the first caller is located within a no-connectivity zone.

20. The computer-implemented method of claim 16, further comprising: notifying the second caller in the one-to-one call that the network feed of the first caller has been re-established, and wherein notifying the second caller comprises providing one or more of: an audible signal associated with the one-to-one call, a visual indication in a representation of the one-to-one call, and a textual indication in the representation of the one-to-one call.

* * * * *